United States Patent
Hirai et al.

(10) Patent No.: US 11,882,133 B2
(45) Date of Patent: Jan. 23, 2024

(54) NETWORK SECURITY APPARATUS, NETWORK SECURITY SYSTEM, AND NETWORK SECURITY METHOD

(71) Applicant: MITSUBISHI ELECTRIC CORPORATION, Tokyo (JP)

(72) Inventors: Hiroaki Hirai, Tokyo (JP); Koji Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 261 days.

(21) Appl. No.: 17/534,729

(22) Filed: Nov. 24, 2021

(65) Prior Publication Data
US 2022/0141238 A1    May 5, 2022

Related U.S. Application Data

(63) Continuation of application No. PCT/JP2019/028365, filed on Jul. 18, 2019.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
None
See application file for complete search history.

(56) References Cited

U.S. PATENT DOCUMENTS

| | | | |
|---|---|---|---|
| 2002/0095421 A1* | 7/2002 | Koskas | G06F 16/284 |
| 2007/0067422 A1 | 3/2007 | Shibasaki | |
| 2017/0006135 A1* | 1/2017 | Siebel | G06Q 10/06 |
| 2017/0149808 A1 | 5/2017 | Hamada et al. | |

(Continued)

FOREIGN PATENT DOCUMENTS

| | | |
|---|---|---|
| EP | 1 035 506 A2 | 9/2000 |
| JP | 2000-259597 A | 9/2000 |

(Continued)

OTHER PUBLICATIONS

Extended European Search Report dated Jun. 10, 2022 issued in corresponding European Application No. 19937373.9.

(Continued)

*Primary Examiner* — Nelson S. Giddins
(74) *Attorney, Agent, or Firm* — Birch, Stewart, Kolasch & Birch, LLP

(57) ABSTRACT

A list-type detection unit (220) performs list-type detection on communication data so as to detect a fraudulent communication. A machine-learning-type detection unit (230) performs machine-learning-type detection on communication data so as to detect a fraudulent communication. A communication acceptance unit (210) receives communication data from a network, and allocates the received communication data to at least one of the list-type detection unit and the machine-learning-type detection unit, using an allocation filter. A filter setting unit (250) determines a parameter value based on a load status of the list-type detection unit and a load status of the machine-learning-type detection unit, and sets the determined parameter value in the allocation filter.

20 Claims, 20 Drawing Sheets

(56) References Cited

U.S. PATENT DOCUMENTS

| | | | |
|---|---|---|---|
| 2017/0230396 | A1 | 8/2017 | Hamada et al. |
| 2017/0279831 | A1 | 9/2017 | Di Pietro et al. |
| 2018/0191743 | A1 | 7/2018 | Reddy et al. |
| 2018/0329823 | A1* | 11/2018 | Brekelbaum ....... G06F 12/0862 |

FOREIGN PATENT DOCUMENTS

| | | |
|---|---|---|
| JP | 2001-34553 A | 2/2001 |
| JP | 2007-116647 A | 5/2007 |
| JP | 2008-129714 A | 6/2008 |
| JP | 2017-143583 A | 8/2017 |
| JP | 2018-98727 A | 6/2018 |

OTHER PUBLICATIONS

"Information and Communications in Japan (Chapter 1, Section 1, 2. & Chapter 3, Section 3, 5. (excerpt))," White Paper, Ministry of Internal Affairs and Communications, Japan, 2018, 9 pages total.
International Search Report (PCT/ISA/210) issued in PCT/JP2019/028365, dated Sep. 17, 2019.
Sato et al., "Security Technologies of IoT Gateway," Mitsubishi Denki Giho, vol. 92, No. 6, Jun. 2018, pp. 24-28.
Written Opinion of the International Searching Authority (PCT/ISA/237) for PCT/JP2019/028365, dated Sep. 17, 2019.

* cited by examiner

Fig. 6

| MODE / ITEM | DUPLEX TYPE | SHARING TYPE | EXCLUSIVE TYPE |
|---|---|---|---|
| ALLOCATION DESTINATION | BOTH | EITHER ONE | PREDETERMINED ONE |
| INTEGRATION METHOD | AND / OR | OR | OR |
| PROCESSING LOAD | HIGH | MEDIUM | LOW |
| COMBINATIONAL EFFECTS | YES | YES | NO |

Fig.17

| LIST NUMBER | SIMPLE LIST<br>LEVEL 1 | DETAILED LIST | |
|---|---|---|---|
| | | LEVEL 2 | LEVEL 3 |
| 100 | | — | — |
| 110 | SATISFIES RULE X1 | — | — |
| 111 | | AND SATISFIES RULE X11 | AND SATISFIES RULE X111 |
| 120 | | AND SATISFIES RULE X12 | — |
| 121 | | | AND SATISFIES RULE X121 |
| 200 | SATISFIES RULE Y1 | — | — |
| 210 | | AND SATISFIES RULE Y11 | — |

NETWORK SECURITY APPARATUS, NETWORK SECURITY SYSTEM, AND NETWORK SECURITY METHOD

CROSS REFERENCE TO RELATED APPLICATIONS

This application is a Continuation of PCT International Application No. PCT/JP2019/028365, filed on Jul. 18, 2019, which is hereby expressly incorporated by reference into the present application.

TECHNICAL FIELD

The present invention relates to a technology to detect a fraudulent communication.

BACKGROUND ART

Against the background of advancement in Internet technologies and various sensor technologies and the like, an IoT era has arrived in which in addition to conventional Internet-connection terminals such as personal computers and smart-phones, various things in the world such as home electric appliances, automobiles, buildings, and factories are connected to the Internet. By 2020, 40 billion devices worldwide are expected to be connected to the Internet.

IoT is an abbreviation for Internet of Things.

While the IoT is rapidly becoming widespread, companies are raising problems related to security.

The security problems are wide-ranging, such as inadequate management in light of a rapidly increasing number of devices, different use methods depending on the application or environment, occurrence of unanticipated threats due to extended periods of use, and limited countermeasures for IoT devices with limited resources.

As a method for solving such problems, detection of a fraudulent communication at a switch or gateway that relays communications is considered, instead of taking counter-measures individually for each IoT device. This is for preventing a security anomaly that occurs through a network.

There are mainly two types of methods for detecting a fraudulent communication as described below.

The first method will be called list-type detection.

The second one will be called machine-learning-type detection.

In list-type detection, allowed communications are defined in detail, and a non-applicable communication is judged to be fraudulent.

Patent Literature 1 discloses list-type detection. This list-type detection can accurately detect an anomaly by inspecting details of a communication including a state transition of the communication. Derivatively, it is also described that in a technique called DPI or the like, a more accurate definition is made by interpreting the content of a message in a communication or specifying a communication timing in detail.

DPI is an abbreviation for Deep Packet Inspection.

In machine-learning-type detection, machine learning is performed on communication traffic in a normal state, and a fraud is judged based on a degree of mismatch with learning results.

Patent Literature 2 discloses machine-learning-type detection. This machine-learning-type detection can detect an anomaly based on statistical information on communication traffic. It is possible to use model information, which is learning results, to determine an anomaly based on a spatial distance or a spatial density, and it is not necessary to manually create a definition file.

CITATION LIST

Patent Literature

Patent Literature 1: JP 2001-34553 A
Patent Literature 2: JP 2017-143583 A

SUMMARY OF INVENTION

Technical Problem

List-type detection has disadvantages such as high human costs for creating a definition file, occurrence of human errors when creating the definition file, and an enormous amount of processing for comparing actual communications with the definition file for verification. Another disadvantage is that it is difficult to create a definition file for a device that does not behave simply.

Machine-learning-type detection has a disadvantage which is enormous computational resources required for machine learning. Another disadvantage is that a behavior different from that at the time of learning is judged to be an anomaly, so that a judgement result does not always match an expected detection result.

As described above, list-type detection and machine-learning-type detection each have advantages and disadvantages. Therefore, list-type detection or machine-learning-type detection is statically selected and used depending on the characteristics of a target system or a target device.

As the IoT is progressing rapidly, it is expected that various devices and systems will coexist in a network. Therefore, it is conceivable that both list-type detection and machine-learning-type detection will be used simultaneously.

As a simple implementation method for realizing simultaneous use, a duplexed device (or system) in which both a device (or system) for list-type detection and a device (or system) for machine-learning-type detection are installed may be considered. However, this method has problems such as high installation and operation costs and complicated network design for installation.

It is an object of the present invention to allow fraudulent communications to be detected by list-type detection and machine-learning-type detection without duplexing a device (or system).

Solution to Problem

A network security apparatus according to the present invention includes
a list-type detection unit to accept communication data, and perform list-type detection on the communication data that has been accepted so as to detect a fraudulent communication;
a machine-learning-type detection unit to accept communication data, and perform machine-learning-type detection on the communication data that has been accepted so as to detect a fraudulent communication;
a communication unit to receive communication data from a network;
an allocation unit to allocate the communication data that has been received to at least one of the list-type detection unit and the machine-learning-type detection unit, using an allocation filter; and a filter setting unit to determine a parameter value for specifying an allocation destination for each of one or more pieces of communication data, based on a load status of the list-type detection unit and a load status of the machine-learning-type detection unit, and set the parameter value that has been determined in the allocation filter.

Advantageous Effects of Invention

According to the present invention, list-type detection or machine-learning-type detection is dynamically selected and used depending on a load status. Therefore, fraudulent communications can be detected by list-type detection and machine-learning-type detection without duplexing a device (or system).

BRIEF DESCRIPTION OF DRAWINGS

FIG. 6 is a comparison table regarding allocation modes in the first embodiment:

FIG. 17 is a schematic diagram of detection condition lists in the second embodiment;

DESCRIPTION OF EMBODIMENTS

Figure 1:
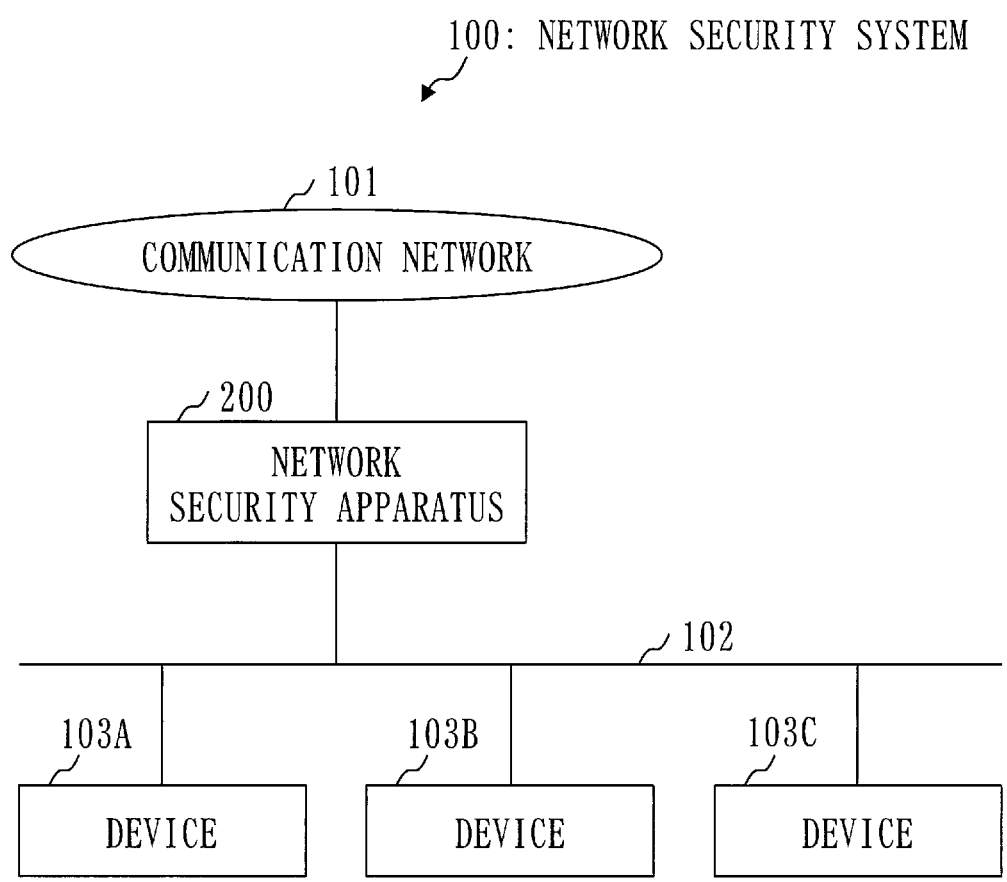
FIG. 1 is a configuration diagram of a network security system 100 in a first embodiment.

In the embodiments and drawings, the same elements or corresponding elements are denoted by the same reference sign. Description of an element denoted by the same reference sign as that of an element that has been described will be omitted or simplified as appropriate. Arrows in the drawings mainly indicate flows of data or flows of processing.

First Embodiment

An embodiment for detecting a fraudulent communication will be described based on FIGS. 1 to 11.

\*\*\*Description of Configuration\*\*\*

Based on FIG. 1, a configuration of a network security system 100 will be described.

The network security system 100 is a network system including a network security apparatus 200 to detect a fraudulent communication.

The network security apparatus 200 is a network device to relay communication data. Specifically, the network security apparatus 200 is a switch, a gateway, or a router.

The network security apparatus 200 is connected with communication networks (101, 102). For example, the communication network 101 is the Internet (external network), and the communication network 102 is a local area network.

The network security apparatus 200 is connected with devices (103A to 103C) via the communication network 102.

When the devices (103A to 103C) are not individually identified, each will be referred to as a device 103.

The device 103 is a device that is part of the IoT.

Communications in the network security system 100 may be wired communications or wireless communications.

The topology of the network security system 100 may be a star type, a bus type, a ring type, or any other type.

Based on FIG. 2, a configuration of the network security apparatus 200 will be described.

The network security apparatus 200 is a computer that includes hardware components such as a processor 201, a memory 202, an auxiliary storage device 203, an input/output interface 204, and communication interfaces (205A to 205C). These hardware components are connected to one another via signal lines.

The processor 201 is an IC that performs operational processing, and controls other hardware components. For example, the processor 201 is a CPU or a DSP.

IC is an abbreviation for Integrated Circuit.

CPU is an abbreviation for Central Processing Unit.

DSP is an abbreviation for Digital Signal Processor.

The memory 202 is a volatile storage device. The memory 202 is also called a main storage device or a main memory. For example, the memory 202 is a RAM. Data stored in the memory 202 is saved to the auxiliary storage device 203 as necessary.

RAM is an abbreviation for Random Access Memory.

The auxiliary storage device 203 is a non-volatile storage device. For example, the auxiliary storage device 203 is a ROM, an HDD, or a flash memory. Data stored in the auxiliary storage device 203 is loaded into the memory 202 as necessary.

ROM is an abbreviation for Read Only Memory.

HDD is an abbreviation for Hard Disk Drive.

The input/output interface 204 is a port to which an input device and an output device are to be connected.

When the communication interfaces (205A to 205C) are not individually identified, each will be referred to as a communication interface 205.

The communication interface 205 is a port to and from which communication data is input and output.

The network security apparatus 200 includes elements such as a communication acceptance unit 210, a list-type detection unit 220, a machine-learning-type detection unit 230, a result output unit 240, and a filter setting unit 250. These elements are realized by software.

The auxiliary storage device 203 stores a network security program for causing a computer to function as the communication acceptance unit 210, the list-type detection unit 220, the machine-learning-type detection unit 230, the result output unit 240, and the filter setting unit 250. The network security program is loaded into the memory 202 and executed by the processor 201.

The auxiliary storage device 203 further stores an OS. At least part of the OS is loaded into the memory 202 and executed by the processor 201.

The processor 201 executes the network security program while executing the OS.

OS is an abbreviation for Operating System.

Input and output data of the network security program is stored in the storage unit 290.

The memory 202 functions as the storage unit 290. However, storage devices such as the auxiliary storage device 203, a register in the processor 201, and a cache memory in the processor 201 may function as the storage unit 290 in place of the memory 202 or together with the memory 202.

The network security apparatus 200 may include a plurality of processors as an alternative to the processor 201. The plurality of processors share the functions of the processor 201.

The network security program can be recorded (stored) in a computer readable format in a non-volatile recording medium such as an optical disc or a flash memory.

Figure 3:
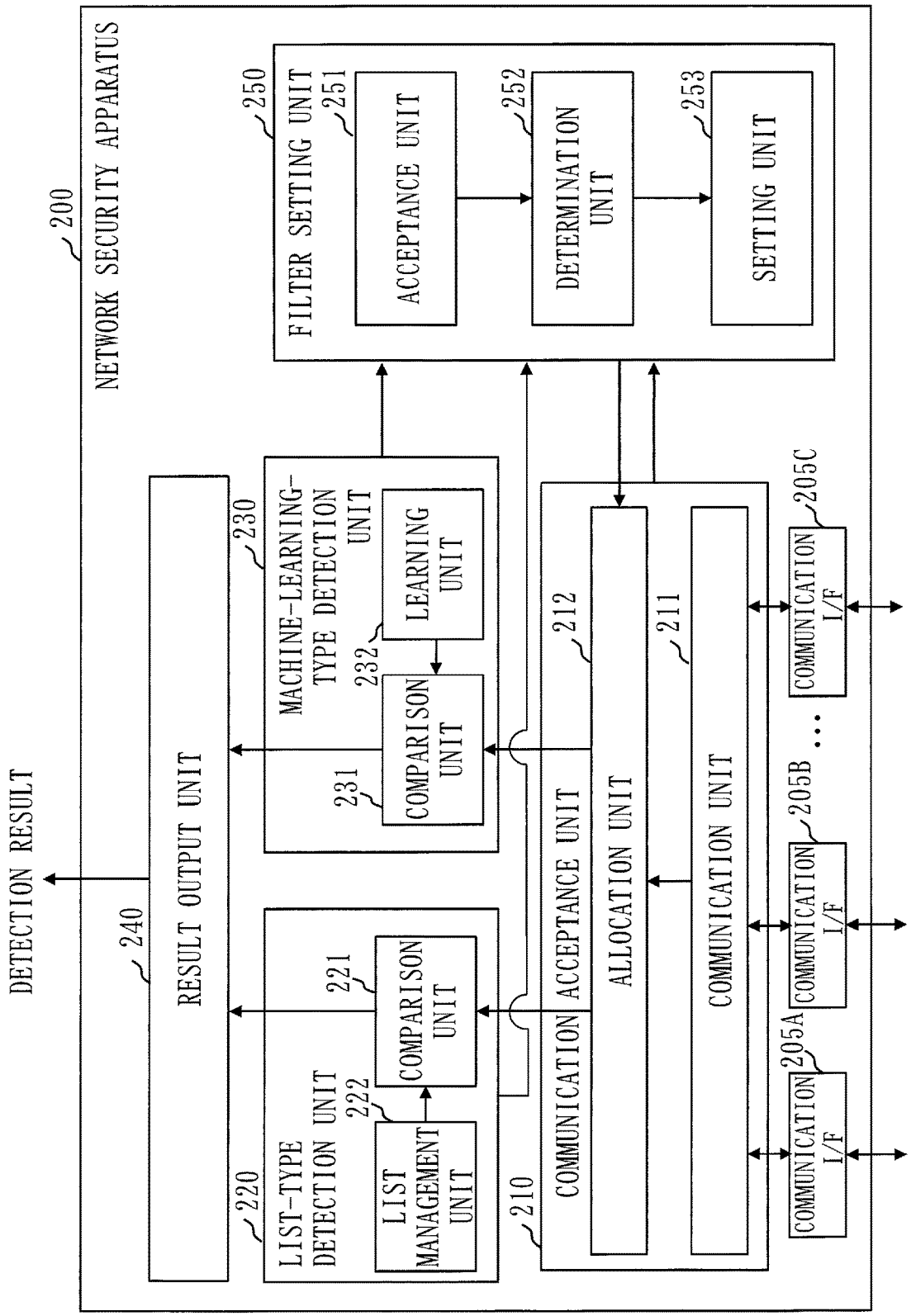
FIG. 3 is a functional configuration diagram of the network security apparatus 200 in the first embodiment.

Based on FIG. 3, a functional configuration of the network security apparatus 200 will be described.

The network security apparatus 200 includes the communication acceptance unit 210, the list-type detection unit 220, the machine-learning-type detection unit 230, the result output unit 240, and the filter setting unit 250.

The communication acceptance unit 210 includes a communication unit 211 and an allocation unit 212.

The list-type detection unit 220 includes a comparison unit 221 and a list management unit 222.

The machine-learning-type detection unit 230 includes a comparison unit 231 and a learning unit 232.

The filter setting unit 250 includes an acceptance unit 251, a determination unit 252, and a setting unit 253.

The functions of these constituent elements will be described later.

\*\*\*Description of Operation\*\*\*

A procedure for operation of the network security apparatus 200 is equivalent to a network security method. The procedure for operation of the network security apparatus 200 is also equivalent to a procedure for processing by the network security program.

Figure 4:
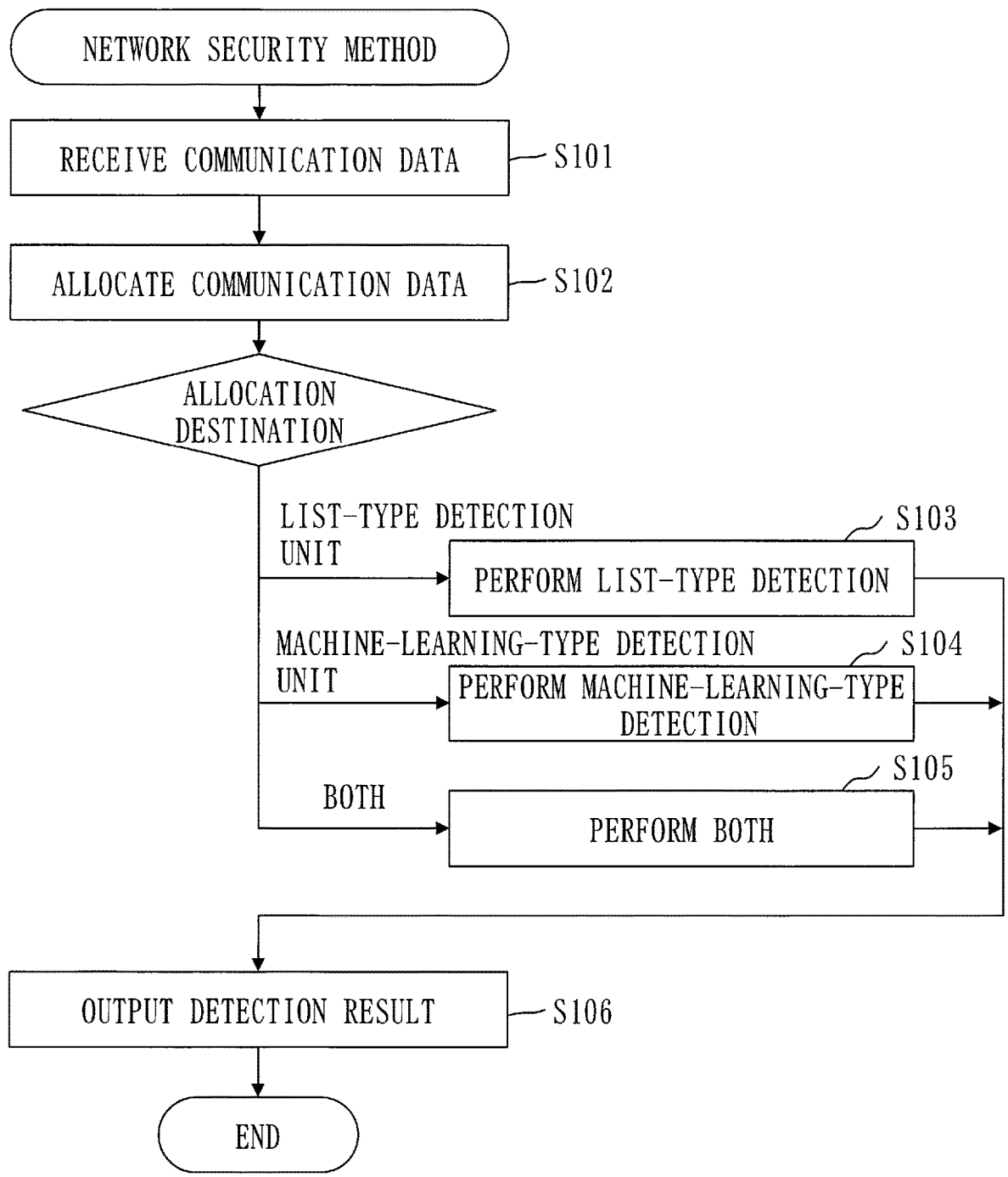
FIG. 4 is a flowchart of a network security method in the first embodiment.

Based on FIG. 4, main processing of the network security method will be described.

Step S101 to step S106 are executed each time communication data arrives at the communication interface 205.

In step S101, the communication unit 211 receives communication data.

Then, the communication unit 211 performs communication exchanging processing between the communication interfaces 205 on the received communication data. That is, the communication unit 211 selects a communication interface 205 depending on the destination of the received communication data, and transmits the received communication data from the selected communication interface 205. This communication exchanging processing is the same as processing performed by a function provided in a typical network device.

The communication unit 211 also inputs the received communication data to the allocation unit 212.

In step S102, the allocation unit 212 accepts the communication data input from the communication unit 211.

Then, the allocation unit 212 allocates the accepted communication data to at least one of the list-type detection unit 220 and the machine-learning-type detection unit 230, using an allocation filter.

The allocation filter is a filter for allocating each of one or more pieces of communication data to at least one of the list-type detection unit 220 and the machine-learning-type detection unit 230. For example, the allocation filter is realized by software.

The allocation filter has a parameter that specifies an allocation rule.

The allocation rule is a rule for determining an allocation destination for each of one or more pieces of communication data.

For example, the allocation rule specifies one of the list-type detection unit 220 and the machine-learning-type detection unit 230, or specifies both of the list-type detection unit 220 and the machine-learning-type detection unit 230.

For example, the allocation rule specifies, for each of the list-type detection unit 220 and the machine-learning-type detection unit 230, a range for information included in communication data, such as a source IP address, a destination IP address, a source MAC address, a destination MAC address, a protocol number, or a data value at a specific place.

If the allocation destination of the accepted communication data is the list-type detection unit 220, the allocation unit 212 inputs the accepted communication data to the list-type detection unit 220. Then, the processing proceeds to step S103.

If the allocation destination of the accepted communication data is the machine-learning-type detection unit 230, the allocation unit 212 inputs the accepted communication data to the machine-learning-type detection unit 230. Then, the processing proceeds to step S104.

If the allocation destination of the accepted communication data is both of the list-type detection unit 220 and the machine-learning-type detection unit 230, the allocation unit 212 inputs the accepted communication data to each of the list-type detection unit 220 and the machine-learning-type detection unit 230. Then, the processing proceeds to step S105.

In step S103, the list-type detection unit 220 accepts the communication data input from the allocation unit 212.

The list-type detection unit 220 performs list-type detection on the accepted communication data.

If a fraudulent communication is detected by list-type detection, the list-type detection unit 220 inputs detection information to the result output unit 240. The detection information indicates information on the detected fraudulent communication, specifically, information on the communication data.

List-type detection is a technique to detect a fraudulent communication, using a list such as a white list or a black list. In the following, the list used in list-type detection will be called a "detection condition list".

In list-type detection, the comparison unit 221 compares information on the accepted communication data with each detection condition indicated in the detection condition list. Then, the comparison unit 221 judges whether the accepted communication data is fraudulent communication data based on comparison results.

Each detection condition is defined with regard to communication information such as the source IP address and the destination IP address. IP is an abbreviation for Internet Protocol.

The detection condition list is managed in the list management unit 222.

The detection condition list may be fixed or may be dynamically changed.

After step S103, the processing proceeds to step S106.

In step S104, the machine-learning-type detection unit 230 accepts the communication data input from the allocation unit 212.

The machine-learning-type detection unit 230 performs machine-learning-type detection on the accepted communication data.

If a fraudulent communication is detected by machine-learning-type detection, the machine-learning-type detection unit 230 inputs detection information to the result output unit 240. The detection information indicates information on the detected fraudulent communication, specifically, information on the communication data.

Machine-learning-type detection is a technique to detect a fraudulent communication, using a learning model obtained by machine learning.

In machine-learning-type detection, the comparison unit 231 calculates an anomaly level of the accepted communication data by executing the learning model, using the accepted communication data as input. The comparison unit 231 compares the calculated anomaly level with a threshold. If the calculated anomaly level is greater than the threshold, the comparison unit 231 judges that the accepted communication data is fraudulent communication data.

The learning model is generated by the learning unit 232.

The learning unit 232 performs machine learning, using a plurality of pieces of normal communication data as input, and generates the learning model, using results of machine learning.

For machine learning, the learning unit 232 performs statistical processing on the plurality of pieces of normal communication data so as to process the plurality of pieces of normal communication data to facilitate machine learning. Then, the learning unit 232 performs machine learning, using the processed communication data.

After step S104, the processing proceeds to step S106.

In step S105, the list-type detection unit 220 accepts the communication data input from the allocation unit 212. The list-type detection unit 220 performs list-type detection on the accepted communication data. If a fraudulent communication is detected by list-type detection, the list-type detection unit 220 inputs detection information to the result output unit 240. Processing by the list-type detection unit 220 is the same as processing in step S103.

Furthermore, the machine-learning-type detection unit 230 accepts the communication data input by the allocation unit 212. The machine-learning-type detection unit 230 performs machine-learning-type detection on the accepted communication data. If a fraudulent communication is detected by machine-learning-type detection, the machine-learning-type detection unit 230 inputs detection information to the result output unit 240. Processing by the machine-learning-type detection unit 230 is the same as processing in step S104.

After step S105, the processing proceeds to step S106.

In step S106, the result output unit 240 accepts the detection information input from each of the list-type detection unit 220 and the machine-learning-type detection unit 230.

The result output unit 240 outputs a detection result regarding the fraudulent communication based on the accepted detection information. For example, the result output unit 240 transmits the detection result to a specific destination. The detection result indicates information on the detected fraudulent communication.

If communication data is allocated to only the list-type detection unit 220 and detection information is input from the list-type detection unit 220 to the result output unit 240, the result output unit 240 outputs the input detection information as a detection result.

If communication data is allocated to only the machine-learning-type detection unit 230 and detection information is input from the machine-learning-type detection unit 230 to the result output unit 240, the result output unit 240 outputs the input detection information as a detection result.

If communication data is allocated to both the list-type detection unit 220 and the machine-learning-type detection unit 230, the result output unit 240 operates as described below. If detection information is input from each of the list-type detection unit 220 and the machine-learning-type detection unit 230, the result output unit 240 integrates the input pieces of detection information to generate a detection result, and outputs the generated detection result. Note that if detection information is input from one of the list-type detection unit 220 and the machine-learning-type detection unit 230, the result output unit 240 may output the input detection information as a detection result.

Figure 5:
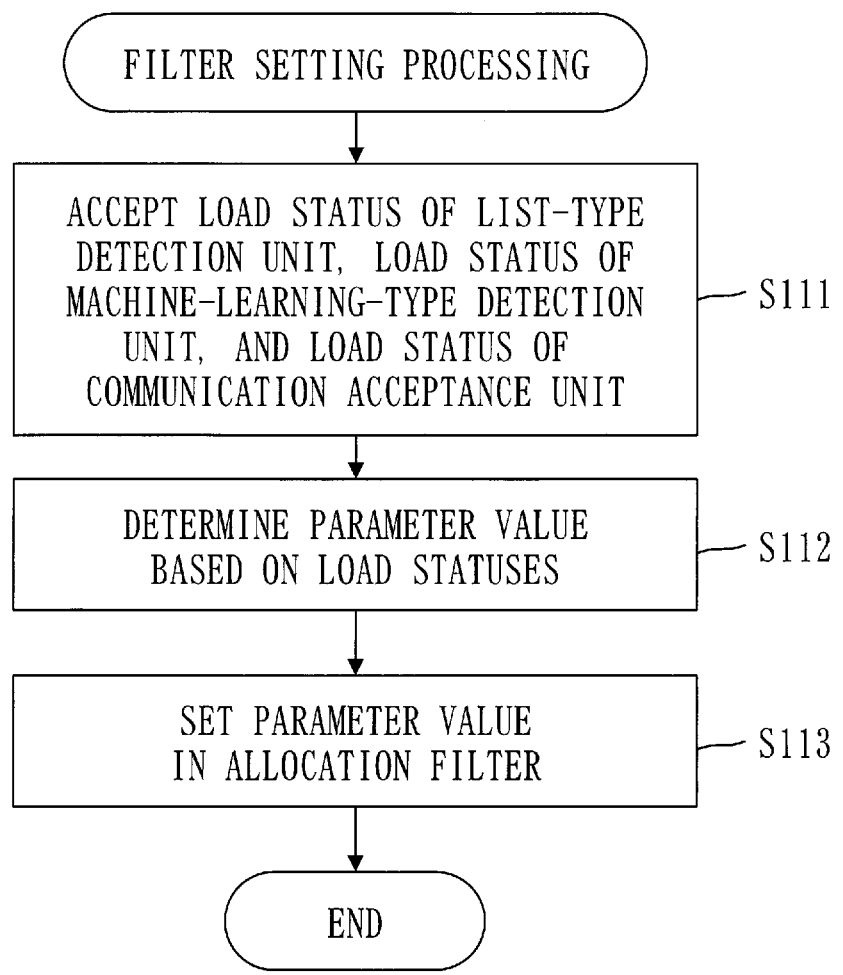
FIG. 5 is a flowchart of filter setting processing in the first embodiment.

Based on FIG. 5, filter setting processing will be described.

The filter setting processing is part of the processing of the network security method.

In step S111, the acceptance unit 251 accepts a load status of the list-type detection unit 220, a load status of the machine-learning-type detection unit 230, and a load status of the communication acceptance unit 210.

The load status is the number of pieces of communication data processed per unit time, the amount of processing executed per unit time, or the like. The load status correlates with a communication status.

The acceptance unit 251 accepts each load status as described below.

The list-type detection unit 220 manages its own load status. The list-type detection unit 220 notifies the filter setting unit 250 of the load status at specific timings. The acceptance unit 251 accepts the notified load status. For example, the specific timings are at regular intervals or each time communication data is allocated and processing to detect a fraudulent communication is executed.

The machine-learning-type detection unit 230 manages its own load status. The machine-learning-type detection unit 230 notifies the filter setting unit 250 of the load status at specific timings. The acceptance unit 251 accepts the notified load status. For example, the specific timings are at regular intervals or each time communication data is allocated and processing to detect a fraudulent communication is executed.

The communication acceptance unit 210 manages its own load status. The communication acceptance unit 210 notifies the filter setting unit 250 of the load status at specific timings. The acceptance unit 251 accepts the notified load status. For example, the specific timings are at regular intervals or each time communication data is allocated.

In step S112, the determination unit 252 determines a parameter value based on the accepted load statuses.

This parameter value is a value that is set in the parameter of the allocation filter.

The allocation filter is used by the allocation unit 212 to allocate communication data.

The determination unit 252 determines the parameter value as described below.

First, the determination unit 252 assesses an overall load status of the network security apparatus 200 based on the accepted load statuses.

Then, the determination unit 252 determines the parameter value in accordance with the overall load status of the network security apparatus 200. For example, the determination unit 252 selects the parameter value corresponding to the overall load status of the network security apparatus 200 from a correspondence table. The correspondence table indicates correspondence relations between load statuses and parameter values.

For example, the determination unit 252 determines a value that identifies an allocation rule to prioritize list-type detection or machine-learning-type detection as the parameter value.

For example, the determination unit 252 determines a value that identifies an allocation rule as described below as the parameter value. The allocation rule limits communication data to be allocated to each of the list-type detection unit 220 and the machine-learning-type detection unit 230. Specifically, the allocation rule specifies a range for information included in communication data, such as the source IP address, the destination IP address, the source MAC address, the destination MAC address, the protocol number, or the data value at a specific place.

In step S113, the setting unit 253 sets the determined parameter value in the parameter of the allocation filter.

Based on FIG. 6, allocation modes in the allocation unit 212 will be described.

There are three types of allocation modes: a duplex type, a sharing type, and an exclusive type.

In the duplex type, the allocation unit 212 allocates each piece of communication data to both of the list-type detection unit 220 and the machine-learning-type detection unit 230. Then, the result output unit 240 detects a fraudulent communication, using detection information obtained by the list-type detection unit 220 and detection information obtained by the machine-learning-type detection unit 230. Therefore, fraudulent communications can be detected without omission. The duplex type has a high processing load, but has high combinational effects.

In the sharing type, the allocation unit 212 allocates each piece of communication data to one of the list-type detection unit 220 and the machine-learning-type detection unit 230. Then, the result output unit 240 detects a fraudulent communication, using detection information based on communication data allocated to the list-type detection unit 220 and detection information based on communication data allocated to the machine-learning-type detection unit 230. Therefore, fraudulent communications can be detected without omission. The sharing type has a low processing load in comparison with the duplex type.

In the exclusive type, the allocation unit 212 allocates all of one or more pieces of communication data to the list-type detection unit 220 or the machine-learning-type detection unit 230. Then, the result output unit 240 detects a fraudulent communication, using detection information obtained by the list-type detection unit 220 or the machine-learning-type detection unit 230. The exclusive type has a low processing load, but has no combinational effects. The exclusive type is highly effective, depending on the situation in the network security system 100.

*Description of Implementation Example*

The network security apparatus 200 may be a dedicated apparatus for detecting a fraudulent communication, instead of a network device such as a switch or a gateway.

The dedicated apparatus for detecting a fraudulent communication will be referred to as a network security apparatus 200A.

Figure 7:
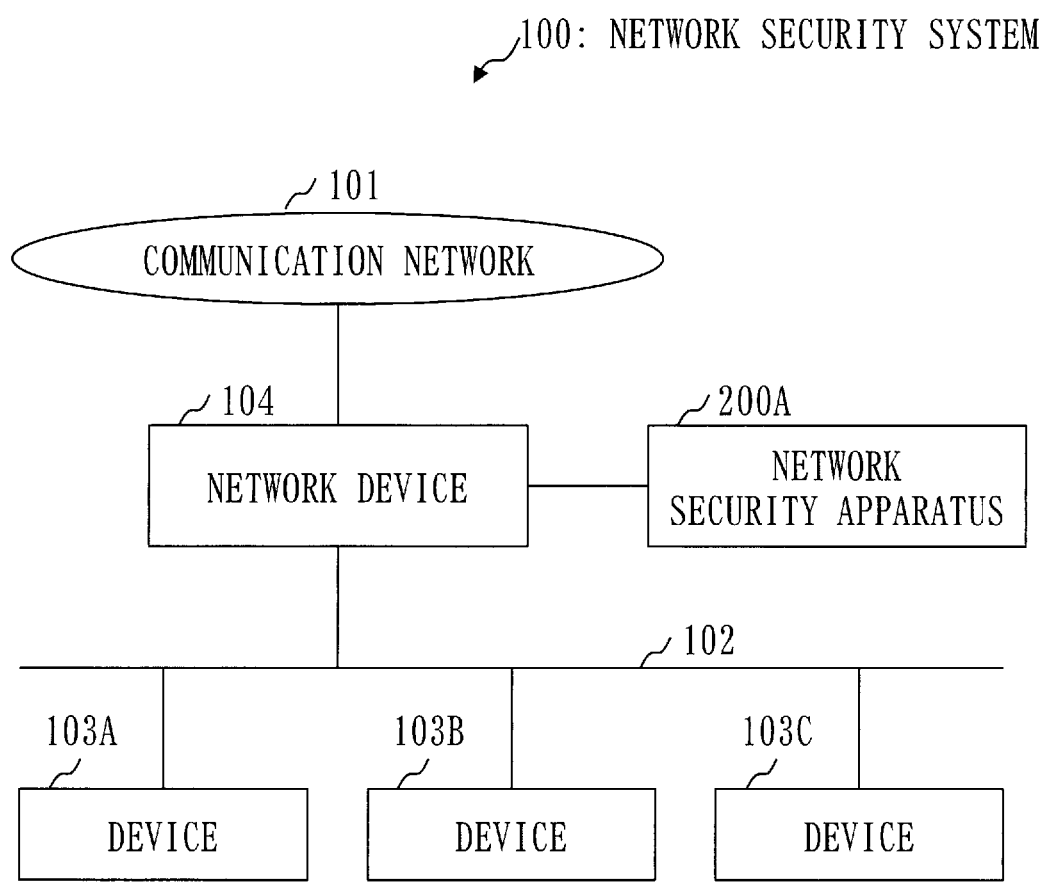
FIG. 7 is a diagram illustrating an example of the configuration of the network security system 100 in the first embodiment.

Based on FIG. 7, an example of the configuration of the network security system 100 will be described.

The network security system 100 includes a network device 104 and the network security apparatus 200A, in place of the network security apparatus 200.

The network device 104 includes a mirror port to output communication data that has been duplicated.

The network security apparatus 200A is connected with the mirror port of the network device 104 and receives communication data output from the mirror port.

Figure 8:
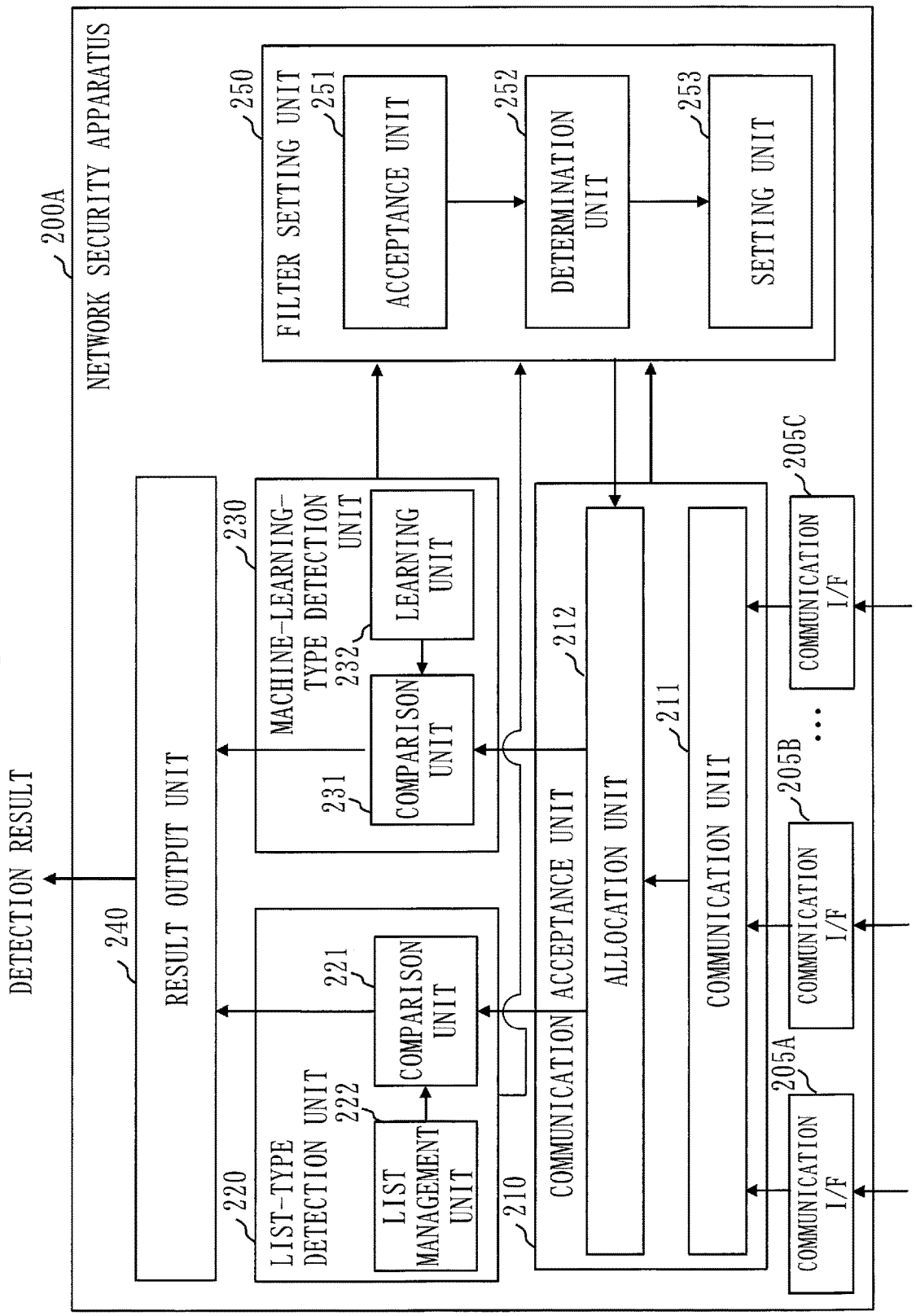
FIG. 8 is a configuration diagram of a network security apparatus 200A in the first embodiment.

Based on FIG. 8, a functional configuration of the network security apparatus 200A will be described.

Like the network security apparatus 200, the network security apparatus 200A includes the communication acceptance unit 210, the list-type detection unit 220, the machine-learning-type detection unit 230, the result output unit 240, and the filter setting unit 250.

However, the communication unit 211 does not perform the communication exchanging processing on received communication data.

Effects of First Embodiment

The first embodiment allows both list-type detection and machine-learning-type detection to be used based on a load status even in an environment in which various devices coexist in a network, in addition, by dynamically setting the parameter of the allocation filter, a network security service can be continued in an environment in which the load status is tight.

By implementing the network security program in a communication apparatus, detection of a fraudulent communication can be realized in accordance with the characteristics of a system and the device 103. Therefore, it is not necessary to duplex the system or the communication apparatus, eliminating the need for network design for duplexing. This reduces installation costs and operation costs.

Figure 9:
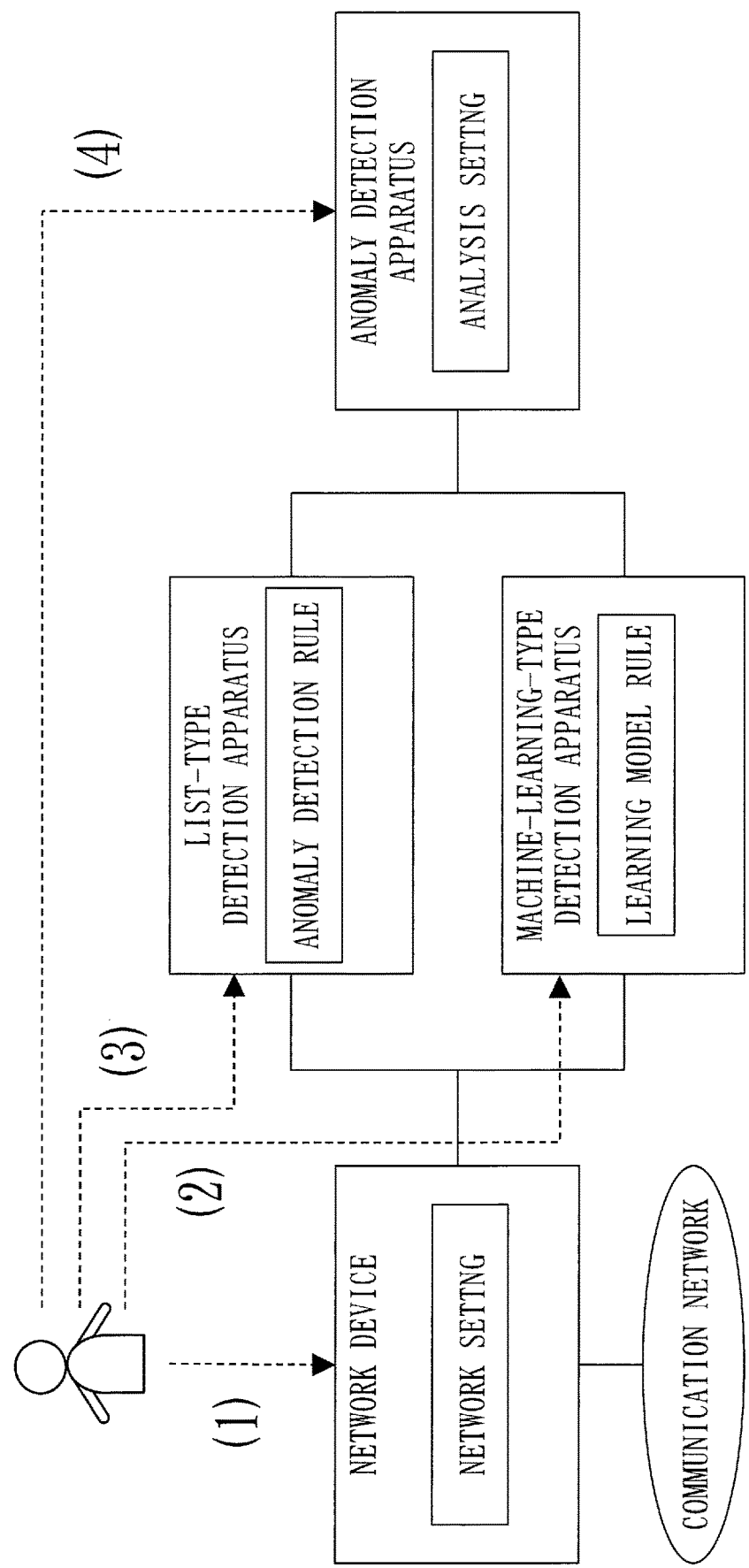
FIG. 9 is a diagram illustrating setting and checking when the network security apparatus (200, 200A) is not used.

For example, when the network security apparatus (200, 200A) is not used (see FIG. 9), an operator needs to make settings and carry out checks for each of (1) to (4) described below. A communication network in FIG. 9 is a communication network to be monitored, and corresponds to the communication network 101 or the communication network 102. A network device corresponds to the device 103 or the network device 104.

(1) The operator makes a setting and carries out a check on the network device. Specifically, the operator makes a setting on the network device so that information of a communication network is transferred to each of a list-type detection apparatus and a machine-learning-type detection apparatus (network setting). Then, the operator checks the network setting. It may be considered that a setting corresponding to the function of the allocation unit 212 is made to the network device. However, this setting is complex and may increase the load on the operator.

(2) The operator sets a learning model rule in the machine-learning-type detection apparatus, and checks the learning model rule that has been set. The machine-learning-type detection apparatus corresponds to the machine-learning-type detection unit 230.

(3) The operator sets an anomaly detection rule in the list-type detection apparatus, and checks the anomaly detection rule that has been set. The list-type detection apparatus corresponds to the list-type detection unit 220.

(4) The operator makes a setting and carries out a check on an anomaly detection apparatus. Specifically, the operator makes a setting on the anomaly detection apparatus so that a detection result obtained by the list-type detection apparatus and a detection result obtained by the machine-learning-type detection apparatus are analyzed to obtain an overall result (analysis setting). Then, the operator checks the analysis setting. The anomaly detection apparatus corresponds to the result output unit 240.

Figure 10:
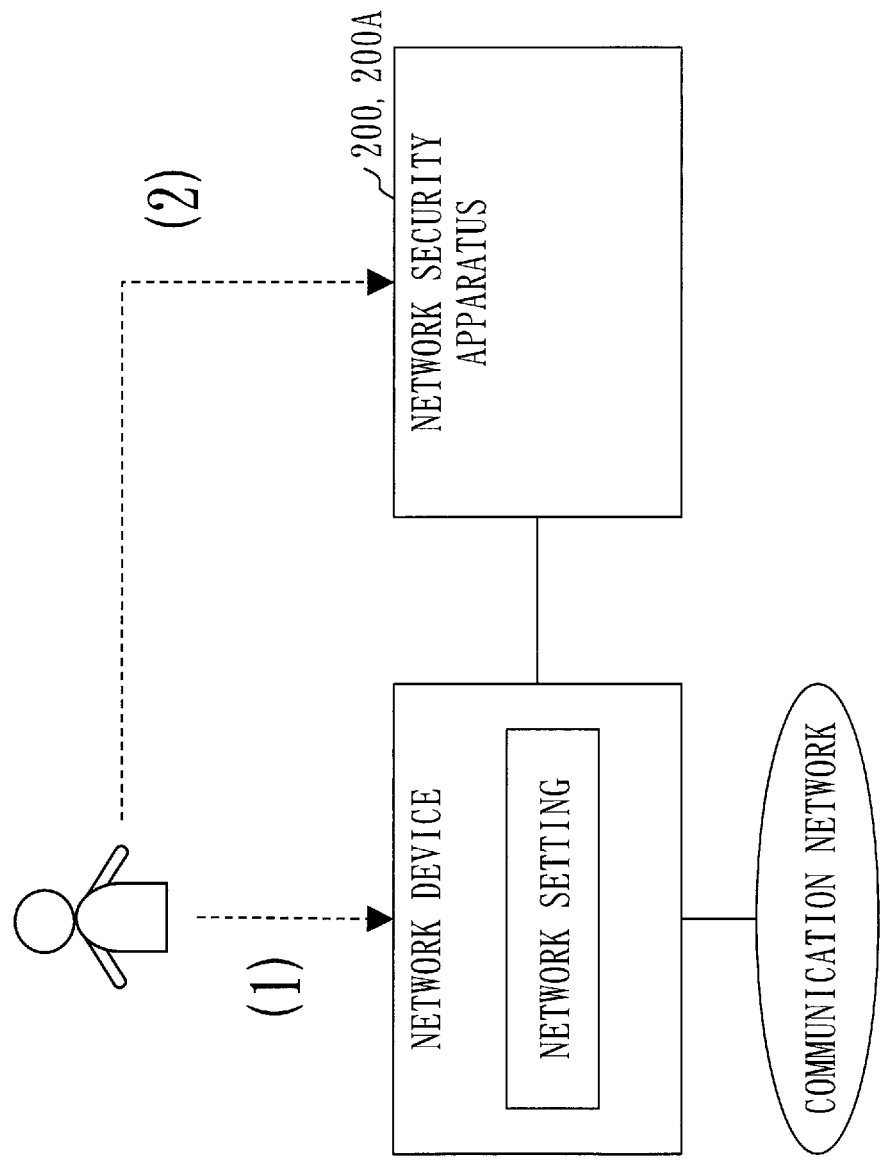
FIG. 10 is a diagram illustrating setting and checking when the network security apparatus (200, 200A) is used.

When the network security apparatus (200, 200A) is used (see FIG. 10), the operator only needs to make settings and carry out checks for (1) and (2) described below. A communication network in FIG. 10 is a communication network to be monitored, and corresponds to the communication network 101 or the communication network 102. A network device corresponds to the device 103 or the network device 104.

(1) The operator makes a setting on the network device so that information of the communication network is transferred to the network security apparatus (200, 200A) (network selling). Then, the operator checks the network setting.

(2) The operator makes settings on the network security apparatus (200, 200A).

As described above, the use of the network security apparatus (200, 200A) simplifies the system configuration and reduces the load on the operator. Therefore, installation costs and operation costs are reduced.

Supplement to First Embodiment

Figure 11:
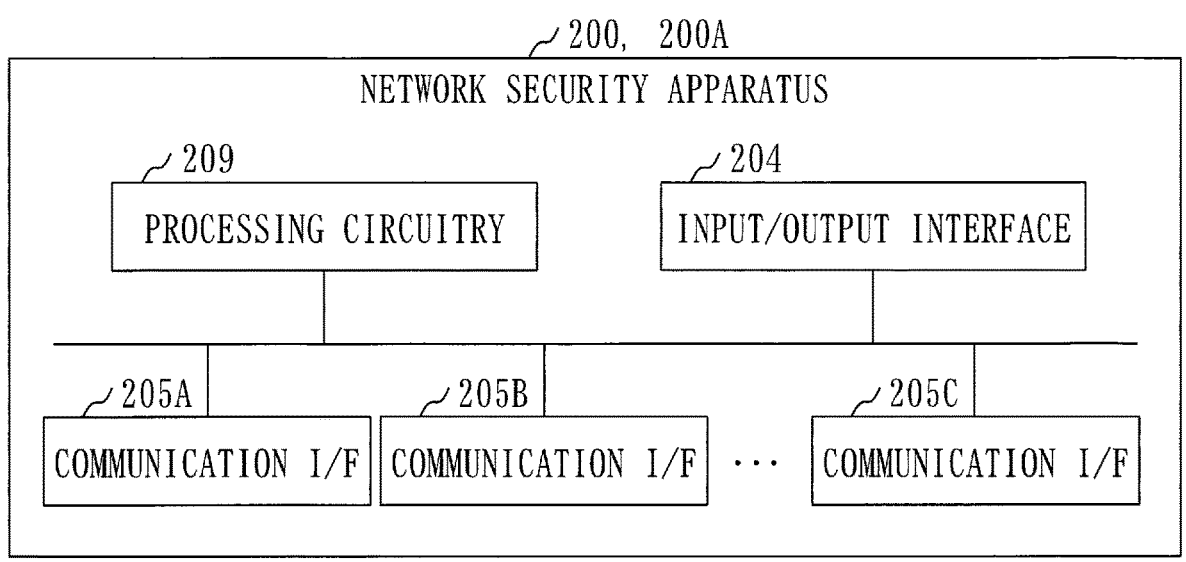
FIG. 11 is a hardware configuration diagram of the network security apparatus (200, 200A) in the first embodiment.

Based on FIG. 11, a hardware configuration of the network security apparatus (200, 200A) will be described.

The network security apparatus (200, 200A) includes processing circuitry 209.

The processing circuitry 209 is hardware that realizes the communication acceptance unit 210, the list-type detection unit 220, the machine-learning-type detection unit 230, the result output unit 240, and the filter setting unit 250.

The processing circuitry 209 may be dedicated hardware, or may be the processor 201 that executes programs stored in the memory 202.

When the processing circuitry 209 is dedicated hardware, the processing circuitry 209 is, for example, a single circuit, a composite circuit, a programmed processor, a parallel-programmed processor, an ASIC, an FPGA, or a combination of these.

ASIC is an abbreviation for Application Specific Integrated Circuit.

FPGA is an abbreviation for Field Programmable Gate Array.

The network security apparatus (200, 200A) may include a plurality of processing circuits as an alternative to the processing circuitry 209. The plurality of processing circuits share the functions of the processing circuitry 209.

In the network security apparatus (200, 200A), some of the functions may be realized by dedicated hardware, and the rest of the functions may be realized by software or firmware.

As described above, each function of the network security apparatus (200, 200A) can be realized by hardware, software, firmware, or a combination of these.

Second Embodiment

With regard to an embodiment for detecting a fraudulent communication, differences from the first embodiment will be mainly described based on FIGS. 12 to 20.

*Description of Configurations*

Figure 12:
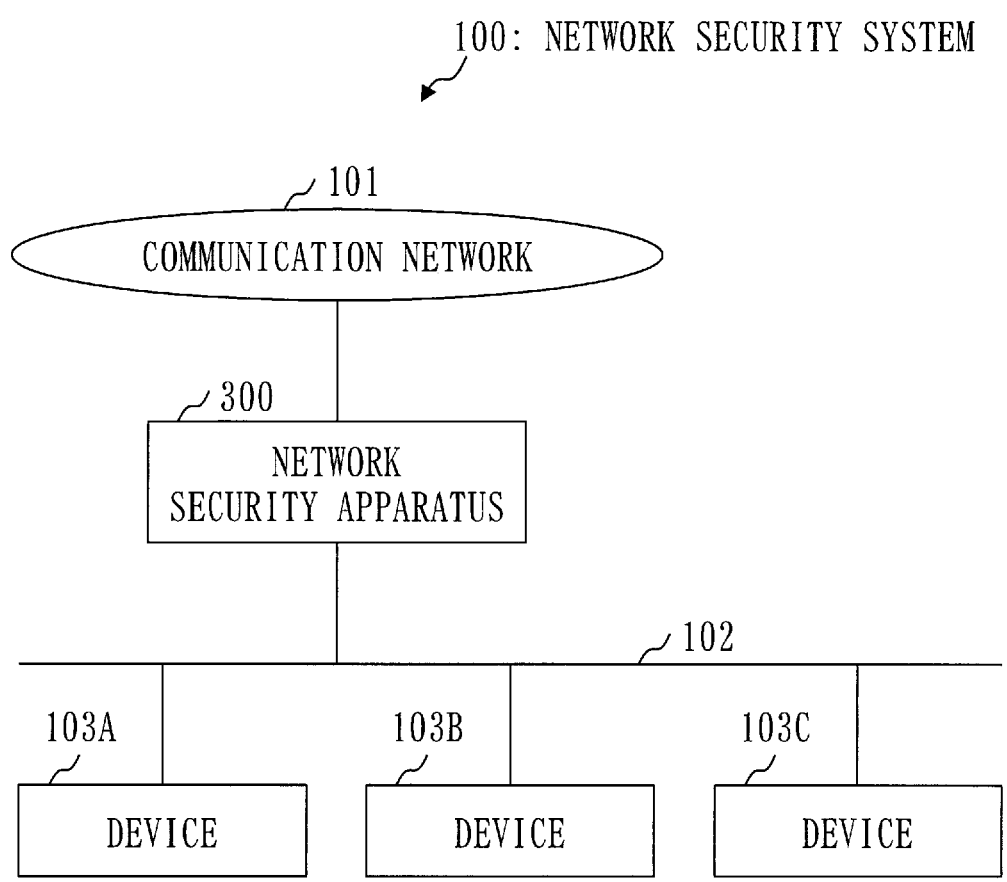
FIG. 12 is a configuration diagram of the network security system 100 in a second embodiment.

Based on FIG. 12, a configuration of the network security system 100 will be described.

The network security system 100 includes a network security apparatus 300 in place of the network security apparatus 200 (see FIG. 1) in the first embodiment.

Figure 13:
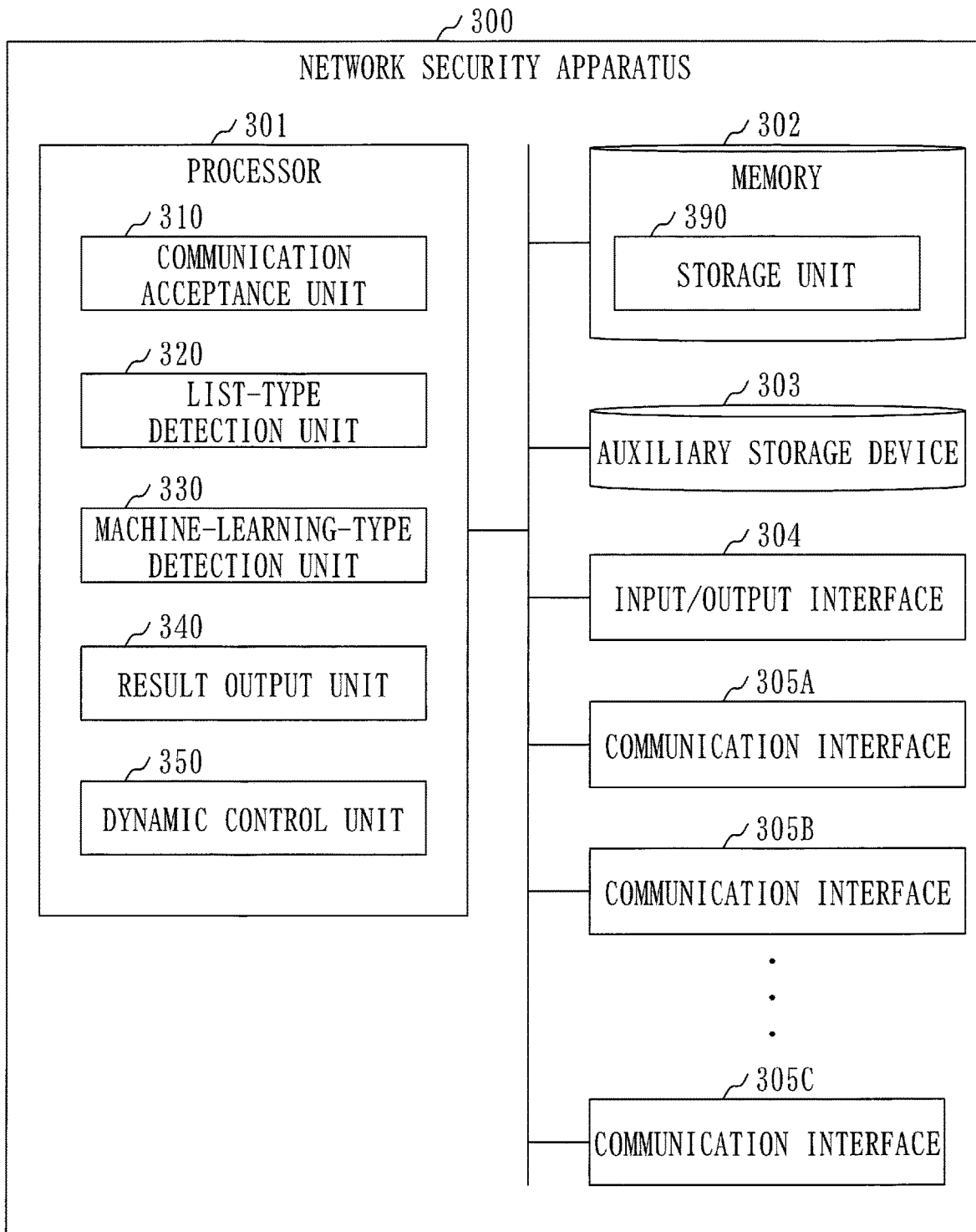
FIG. 13 is a configuration diagram of a network security apparatus 300 in the second embodiment.

Based on FIG. 13, a configuration of the network security apparatus 300 will be described.

The network security apparatus 300 is a computer that includes hardware components such as a processor 301, a memory 302, an auxiliary storage device 303, an input/output interface 304, and communication interfaces (305A to 305C).

Figure 2:
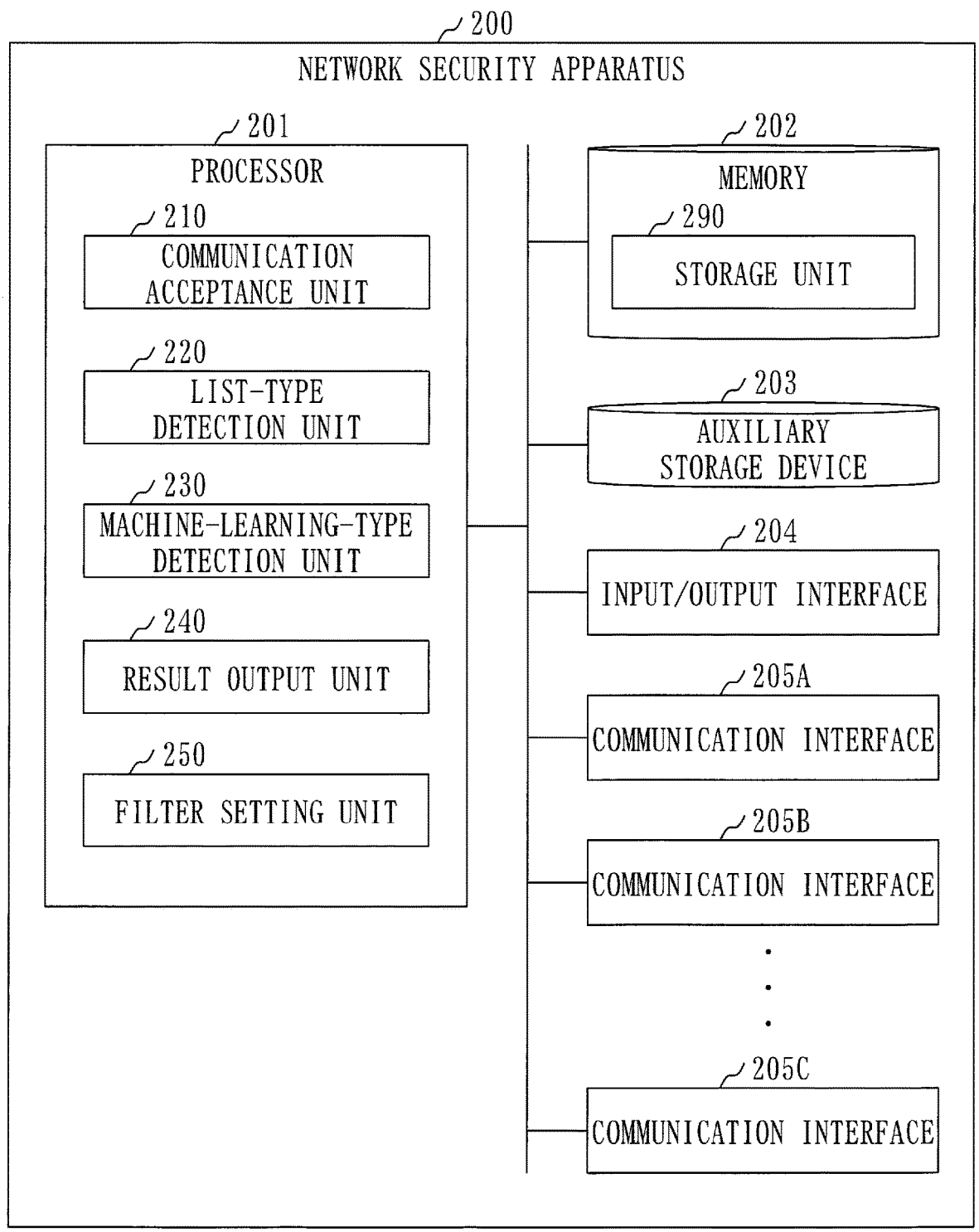
FIG. 2 is a configuration diagram of a network security apparatus 200 in the first embodiment.

Theses hardware components correspond to the hardware components (201 to 204, 205A to 205C) of the network security apparatus 200 in the first embodiment (see FIG. 2).

The network security apparatus 300 includes elements such as a communication acceptance unit 310, a list-type detection unit 320, a machine-learning-type detection unit 330, a result output unit 340, and a dynamic control unit 350. These elements are realized by software.

The network security program causes a computer to function as the communication acceptance unit 310, the list-type detection unit 320, the machine-learning-type detection unit 330, the result output unit 340, and the dynamic control unit 350.

Figure 14:
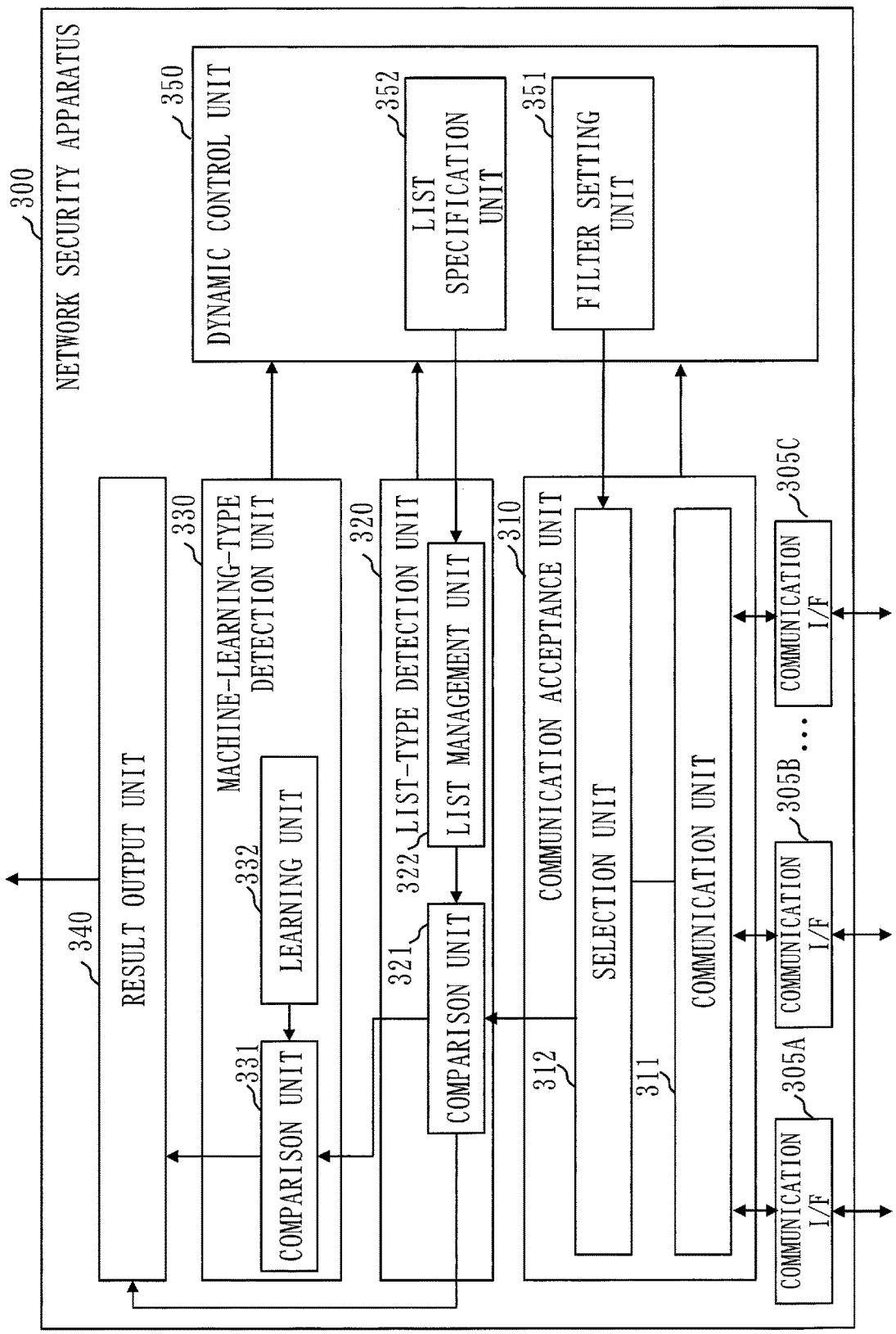
FIG. 14 is a functional configuration diagram of the network security apparatus 300 in the second embodiment.

Based on FIG. 14, a functional configuration of the network security apparatus 300 will be described.

The network security apparatus 300 includes the communication acceptance unit 310, the list-type detection unit 320, the machine-learning-type detection unit 330, the result output unit 340, and the dynamic control unit 350.

The communication acceptance unit 310 includes a communication unit 311 and a selection unit 312.

The list-type detection unit 320 includes a comparison unit 321 and a list management unit 322.

The machine-learning-type detection unit 330 includes a comparison unit 331 and a learning unit 332.

The dynamic control unit 350 includes a filter setting unit 351 and a list specification unit 352.

The functions of these constituent elements will be described later.

*Description of Operation*

Figure 15:
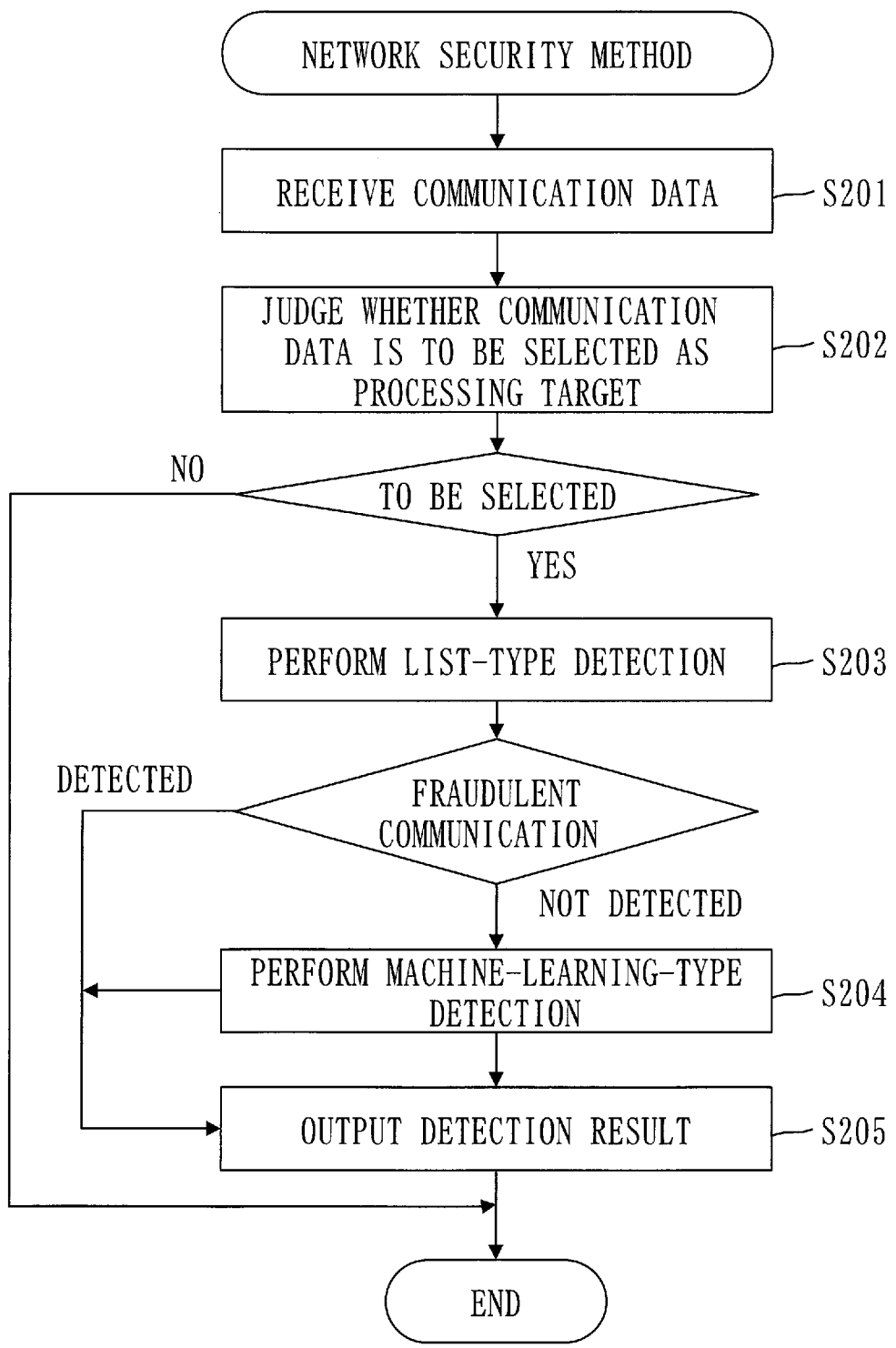
FIG. 15 is a flowchart of a network security method in the second embodiment.

Based on FIG. 15, main processing of the network security method will be described.

Step S201 to step S205 are executed each time communication data arrives at the communication interface 305.

In step S201, the communication unit 311 receives communication data.

Then, the communication unit 311 performs communication exchanging processing between the communication interfaces 305 on the received communication data.

The communication unit 311 also inputs the received communication data to the selection unit 312.

In step S202, the selection unit 312 accepts the communication data input from the communication unit 311.

Then, the selection unit 312 judges whether or not the accepted communication data is to be selected as a processing target, using a selection filter.

The selection filter is a filter for selecting one or more pieces of communication data from a plurality of pieces of communication data. For example, the selection filter is realized by software.

The selection filter has a parameter that specifies a selection rule.

The selection rule is a rule for judging whether or not communication data needs to be selected.

For example, the selection rule specifies a range for information included in communication data, such as the source IP address, the destination IP address, the source MAC address, the destination MAC address, the protocol number, or the data value at a specific place.

If the accepted communication data is selected as the processing target, the selection unit 312 inputs the accepted communication data to the list-type detection unit 320. Then, the processing proceeds to step S203.

If the accepted communication data is not selected as the processing target, the processing ends.

In step S203, the list-type detection unit 320 accepts the communication data input from the selection unit 312.

The list-type detection unit 320 performs list-type detection on the accepted communication data.

List-type detection is as described in step S103 in the first embodiment.

However, the list-type detection unit 320 performs list-type detection, using a list specified by the list specification unit 352. The specification of a list by the list specification unit 352 will be described later.

If a fraudulent communication is detected by list-type detection, the list-type detection unit 320 inputs detection information to the result output unit 340. Then, the processing proceeds to step S205.

If a fraudulent communication is not detected by list-type detection, the list-type detection unit 320 inputs the accepted communication data to the machine-learning-type detection unit 330. Then, the processing proceeds to step S204.

In step S204, the machine-learning-type detection unit 330 accepts the communication data input from the list-type detection unit 320.

Machine-learning-type detection unit 330 performs machine-learning-type detection on the accepted communication data.

The machine-learning-type detection is as described in step S104 in the first embodiment.

If a fraudulent communication is detected by machine-learning-type detection, the machine-learning-type detection unit 330 inputs detection information to the result output unit 340.

After step S204, the processing proceeds to step S205.

In step S205, the result output unit 340 accepts the detection information input from the list-type detection unit 320 or the machine-learning-type detection unit 330.

The result output unit 340 outputs a detection result regarding the fraudulent communication based on the accepted detection information. For example, the result output unit 240 transmits the detection result to a specific destination. The detection result indicates information on the detected fraudulent communication.

If detection information is input from the list-type detection unit 320 to the result output unit 340, the result output unit 340 outputs the input detection information as a detection result.

If detection information is input from the machine-learning-type detection unit 330 to the result output unit 340, the result output unit 340 outputs the input detection information as a detection result.

Figure 16:
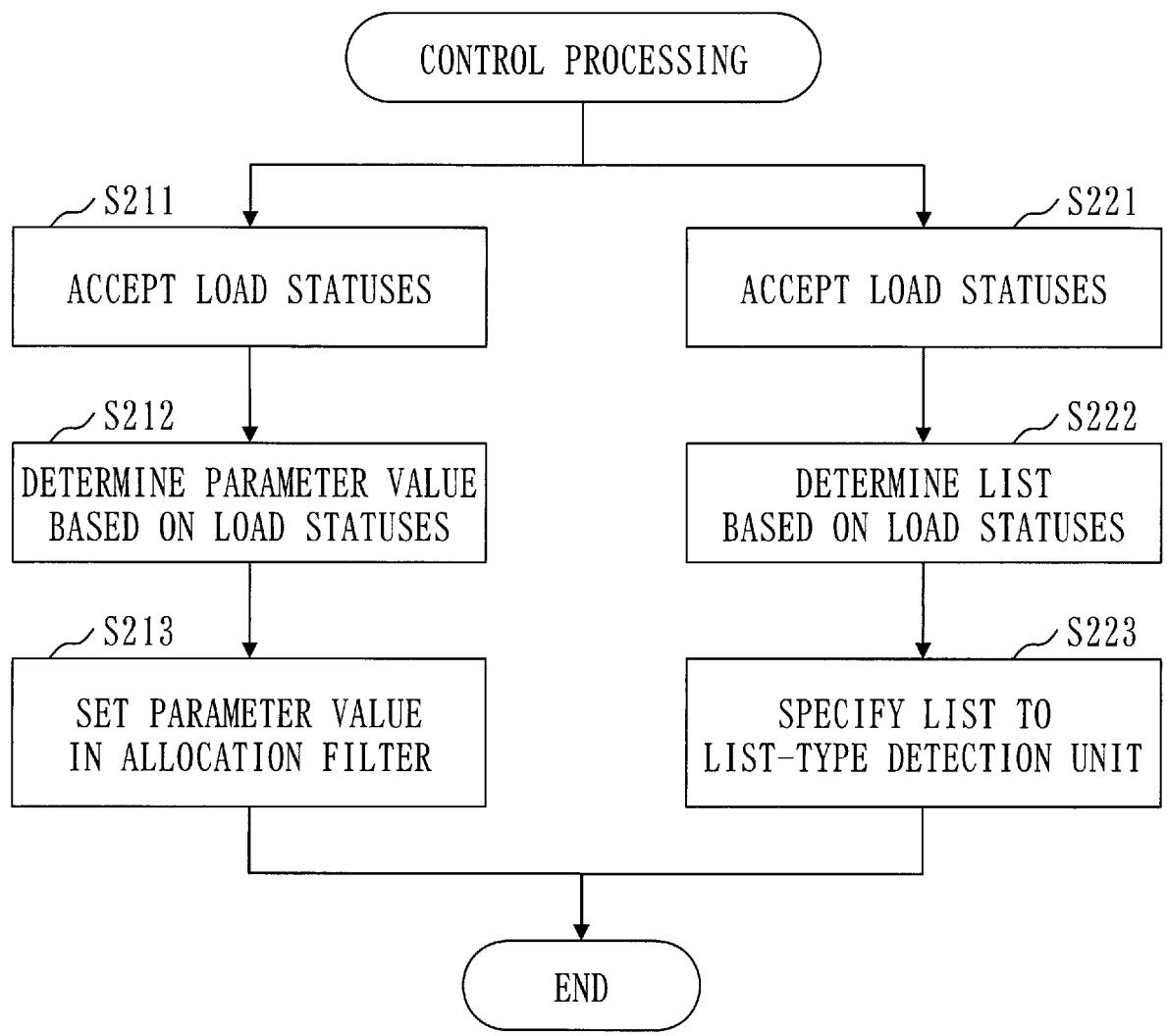
FIG. 16 is a flowchart of control processing in the second embodiment.

Based on FIG. 16, control processing will be described.

The control processing is part of the processing of the network security method.

In step S211, the filter setting unit 351 accepts a load status of the list-type detection unit 320, a load status of the machine-learning-type detection unit 330, and a load status of the communication acceptance unit 310.

Step S211 is the same as step S111 (see FIG. 5) in the first embodiment.

In step S212, the filter setting unit 351 determines a parameter value based on the accepted load statuses.

This parameter value is a value to be set in the parameter of the selection filter.

The selection filter is used by the selection unit 312 to select communication data.

The filter setting unit 351 determines the parameter value as described below.

First, the filter setting unit 351 assesses an overall load status of the network security apparatus 300 based on the accepted load statuses.

Then, the filter setting unit 351 determines the parameter value in accordance with the overall load status of the network security apparatus 300. For example, the filter setting unit 351 selects a parameter value corresponding to the overall load status of the network security apparatus 300 from a correspondence table. The correspondence table indicates correspondence relations between load statuses and parameter values.

For example, the filter setting unit 351 determines a value that identifies a selection rule as described below as the parameter value. The selection rule limits communication data to be selected as the processing target for detecting a fraudulent communication. Specifically, the selection rule specifies a range for information included in communication data, such as the source IP address, the destination IP address, the source MAC address, the destination MAC address, the protocol number, or the data value at a specific place.

In step S213, the filter setting unit 351 sets the determined parameter value in the parameter of the allocation filter.

In step S221, the list specification unit 352 accepts a load status of the list-type detection unit 320, a load status of the machine-learning-type detection unit 330, and a load status of the communication acceptance unit 310.

Step S221 is the same as step S111 (see FIG. 5) in the first embodiment.

In step S222, the list specification unit 352 determines a list (detection condition list) to be used for list-type detection based on the accepted load statuses.

The list specification unit 352 determines the detection condition list as described below.

First, the list specification unit 352 assesses an overall load status of the network security apparatus 300 based on the accepted load statuses.

Then, the list specification unit 352 determines the detection condition list in accordance with the overall load status of the network security apparatus 300. For example, the list specification unit 352 selects the detection condition list corresponding to the overall load status of the network security apparatus 300 from a correspondence table. The correspondence table indicates correspondence relations between load statuses and detection condition lists.

In step S223, the list specification unit 352 specifies the determined detection condition list to the list-type detection unit 320.

Based on FIG. 17, types of detection condition lists will be described.

In list-type detection, one of a plurality of detection condition lists is selected and used depending on the load status. For example, in list-type detection, one of two detection lists is selected and used. One is a detailed list and the other is a simple list.

The detailed list is a list of detailed detection conditions. In the detailed list, each detection condition is defined by a plurality of rules. The plurality of rules are defined on a plurality of levels. A combination of a plurality of rules becomes one detection condition. For example, a combination of rule (100), rule (110), and rule (111) becomes one detection condition. Specifically, conditions "satisfies rule X1, and satisfies rule X11, and satisfies rule X111" becomes a detection condition.

The simple list is a list of simple detection conditions. In the simple list, each detection condition is defined by one rule. For example, rule (100) becomes a detection condition. Specifically, a condition "satisfies rule X1" becomes a detection condition.

The list specification unit 352 selects the detailed list in a situation with where the load is not high and selects the simple list in a situation where the load is high.

*Description of Implementation Example*

The dynamic control unit 350 may predict an increase or a decrease in the load based on a time series of the load status, and may determine each of the parameter value and the detection condition list based on a prediction result.

This makes it possible to deal with a sudden increase in the load due to a sudden increase in traffic. For example, a sudden increase in traffic occurs when a malicious attack, such as a DoS attack, occurs or a communication error due to a failure of an IoT device occurs.

DoS is an abbreviation for Denial of Service attack.

The network security apparatus 300 may be a dedicated apparatus for detecting a fraudulent communication, instead of a network device such as a switch or a gateway.

The dedicated apparatus for detecting a fraudulent communication will be referred to as a network security apparatus 300A.

Figure 18:
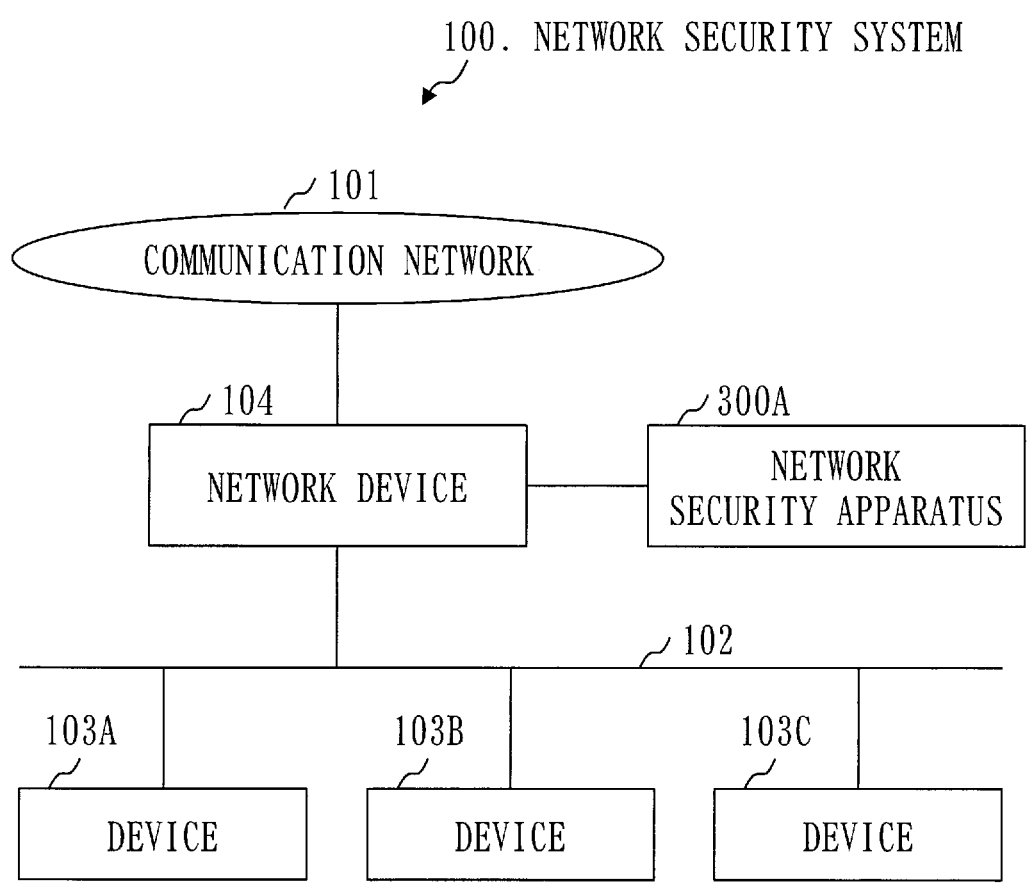
FIG. 18 is a diagram illustrating an example of the configuration of the network security system 100 in the second embodiment.

Based on FIG. 18, an example of the configuration of the network security system 100 will be described.

The network security system 100 includes the network device 104 and the network security apparatus 300A, in place of the network security apparatus 300.

The network device 104 includes a mirror port to output communication data that has been duplicated.

The network security apparatus 300A is connected with the mirror port of the network device 104, and receives communication data output from the mirror port.

Figure 19:
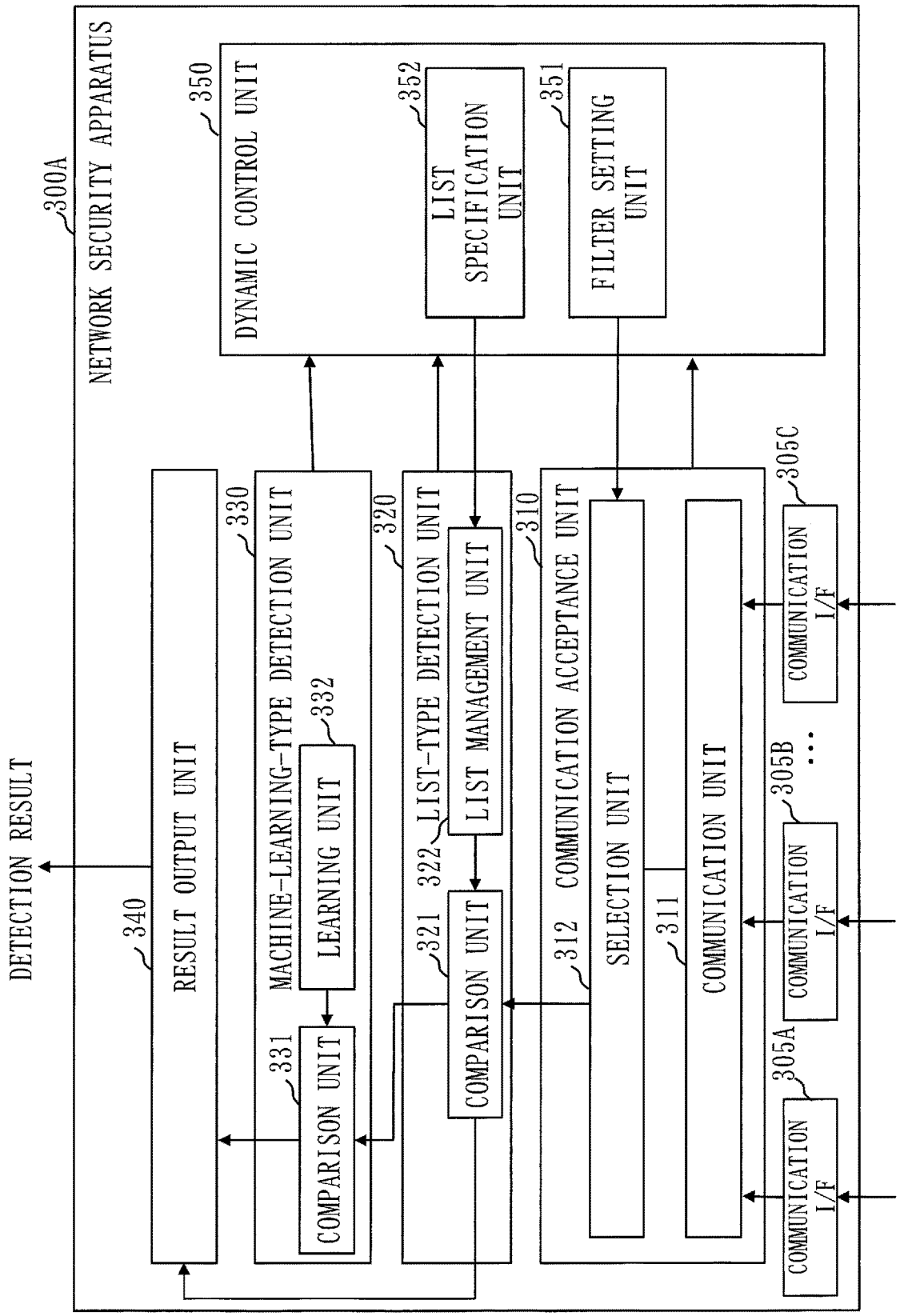
FIG. 19 is a diagram illustrating an example of the configuration of the network security apparatus 300 in the second embodiment.

Based on FIG. 19, a functional configuration of the network security apparatus 300A will be described.

Like the network security apparatus 300, the network security apparatus 300A includes the communication acceptance unit 310, the list-type detection unit 320, the machine-learning-type detection unit 330, the result output unit 340, and the dynamic control unit 350.

However, the communication unit 311 does not perform the communication exchanging processing on received communication data.

Effects of Second Embodiment

The second embodiment allows both list-type detection and machine-learning-type detection to be used based on a load status even in an environment in which various devices coexist in a network. In addition, by dynamically setting the parameter of the allocation filter, a network security service can be continued in an environment in which the load status is tight. Furthermore, by dynamically changing the allocation rule in list-type detection, a network security service can be continued.

By implementing the network security program in a communication apparatus, detection of a fraudulent communication can be realized in accordance with the characteristics of a system and the device 103. Therefore, it is not necessary to duplex the system or the communication apparatus, eliminating the need for network design for duplexing. This reduces installation costs and operation costs.

Supplement to Second Embodiment

Figure 20:
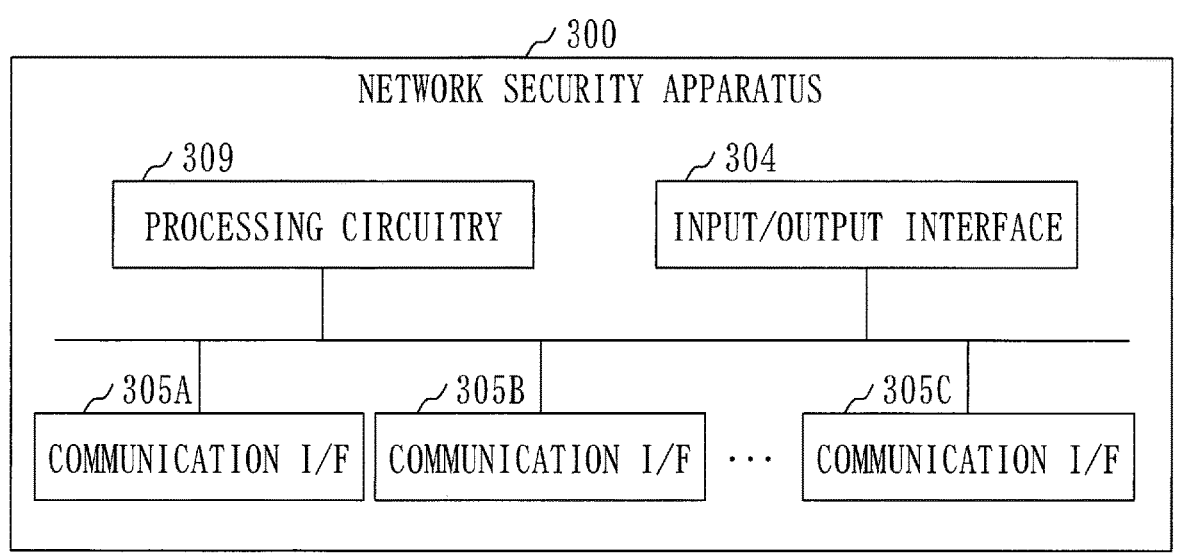
FIG. 20 is a hardware configuration diagram of the network security apparatus (300, 300A) in the second embodiment.

Based on FIG. 20, a hardware configuration of the network security apparatus (300, 300A) will be described.

The network security apparatus (300, 300A) includes processing circuitry 309.

The processing circuitry 309 is hardware that realizes the communication acceptance unit 310, the list-type detection unit 320, the machine-learning-type detection unit 330, the result output unit 340, and the dynamic control unit 350.

Like the processing circuitry 209 (see FIG. 11) in the first embodiment, the processing circuitry 309 may be dedicated hardware, or may be the processor 301 that executes programs stored in the memory 302.

In the network security apparatus (300, 300A), some of the functions may be realized by dedicated hardware, and the rest of the functions may be realized by software or firmware.

As described above, each function of the network security apparatus (300, 300A) may be realized by hardware, software, firmware, or a combination of these.

Supplement to Embodiments

The embodiments are examples of preferred embodiments, and are not intended to limit the technical scope of the present invention. The embodiments may be partially implemented, or may be implemented in combination with another embodiment. The procedures described using flowcharts or the like may be modified as appropriate.

For example, list control (step S214 and step S215) in the second embodiment may be applied to the first embodiment. That is, the detection condition list may be dynamically changed in the first embodiment.

Load prediction (see the implementation example) in the second embodiment may be applied to the first embodiment. That is, in the first embodiment, an increase or a decrease in the load may be predicted based on a time series of the load status, and each of the parameter value and the detection condition list may be determined based on a prediction result.

Each "unit", which is an element of the network security apparatus 200, may be interpreted as "process" or "step".

REFERENCE SIGNS LIST

100: network security system, 101: communication network, 102: communication network, 103: device, 104: network device, 200: network security apparatus, 201: processor, 202: memory, 203: auxiliary storage device, 204: input/output interface, 205: communication interface, 209: processing circuitry, 210: communication acceptance unit, 211: communication unit, 212: allocation unit, 220: list-type detection unit, 221: comparison unit, 222: list management unit, 230: machine-learning-type detection unit, 231: comparison unit, 232: learning unit, 240: result output unit, 250: filter setting unit, 251: acceptance unit, 252: determination unit. 253: setting unit, 290: storage unit, 300: network security apparatus, 301: processor, 302: memory, 303: auxiliary storage device. 304: input/output interface, 305: communication interface, 309: processing circuitry, 310: communication acceptance unit, 311: communication unit, 312: selection unit, 320: list-type detection unit, 321: comparison unit, 322: list management unit, 330: machine-learning-type detection unit, 331: comparison unit, 332: learning unit, 340: result output unit, 350: dynamic control unit, 351: filter setting unit, 352: list specification unit, 390: storage unit.

The invention claimed is:

1. A network security apparatus comprising:
processing circuitry to:
accept communication data, and perform list-type detection on the communication data that has been accepted so as to detect a fraudulent communication;
accept communication data, and perform machine-learning-type detection on the communication data that has been accepted so as to detect a fraudulent communication;
receive communication data from a network;
allocate the communication data that has been received to at least one of the list-type detection and the machine-learning-type detection, using an allocation fitter; and
determine a parameter value for specifying an allocation destination for each of one or more pieces of communication data, based on a load status of the list-type detection and a load status of the machine-learning-type detection, and set the parameter value that has been determined in the allocation filter.

2. The network security apparatus according to claim 1, wherein the processing circuitry assesses an overall load status of the network security apparatus, based on the load status of the list-type detection and the load status of the machine-learning-type detection, and determines the parameter value in accordance with the overall load status of the network security apparatus.

3. The network security apparatus according to claim 1, wherein the processing circuitry outputs a detection result regarding a fraudulent communication, based on detection information obtained by the list-type detection and detection information obtained by the machine-learning-type detection.

4. The network security apparatus according to claim 2, wherein the processing circuitry outputs a detection result regarding a fraudulent communication, based on detection information obtained by the list-type detection and detection information obtained by the machine-learning-type detection.

5. A network security system comprising:
processing circuitry to:
accept communication data, and perform list-type detection on the communication data that has been accepted so as to detect a fraudulent communication;
accept communication data, and perform machine-learning-type detection on the communication data that has been accepted so as to detect a fraudulent communication;
receive communication data from a network;
allocate the communication data that has been received to at least one of the list-type detection and the machine-learning-type detection, using an allocation filter; and
determine a parameter value for determining an allocation destination for each of one or more pieces of communication data, based on a load status of the list-type detection and a load status of the machine-learning-type detection, and set the parameter value that has been determined in the allocation filter.

6. A network security method comprising:
accepting communication data, and performing list-type detection on the communication data that has been accepted so as to detect a fraudulent communication;
accepting communication data, and performing machine-learning-type detection on the communication data that has been accepted so as to detect a fraudulent communication;
receiving communication data from a network;
allocating the communication data that has been received to at least one of the list type detection and the machine-learning-type detection, using an allocation filter; and
determining a parameter value for determining an allocation destination for each of one or more pieces of communication data, based on a load status of the list-type detection and a load status of the machine-learning-type detection, and setting the parameter value that has been determined in the allocation filter.

7. A network security apparatus comprising:
processing circuitry to:
receive a plurality of pieces of communication data from a network;
select one or more pieces of communication data from the plurality of pieces of communication data that have been received, using a selection filter;
accept the one or more pieces of communication data that have been selected, and perform list-type detection on the one or more pieces of communication data that have been accepted so as to detect a fraudulent communication;
accept each piece of communication data from which a fraudulent communication has not been detected by the list-type detection, and perform machine-learning-type detection on each piece of communication data that has been accepted so as to detect a fraudulent communication; and
determine a parameter value for specifying communication data to be selected, based on a load status of the list-type detection and a load status of the machine-learning-type detection, and set the parameter value that has been determined in the selection filter.

8. The network security apparatus according to claim 7, wherein the processing circuitry assesses an overall load status of the network security apparatus, based on the load status of the list-type detection and the load status of the machine-learning-type detection, and determines the parameter value in accordance with the overall load status of the network security apparatus.

9. The network security apparatus according to claim 7, wherein the processing circuitry determines a list to be used in the list-type detection based on the load status of the list-type detection and the load status of the machine-learning-type detection, and specifies the list that has been determined for the list type detection, and
performs the list-type detection, using the list that has been specified.

10. The network security apparatus according to claim 9, wherein the processing circuitry assesses an overall load status of the network security apparatus, based on the load status of the list-type detection and the load status of the machine-learning-type detection, and determines the list in accordance with the overall load status of the network security apparatus.

11. The network security apparatus according to claim 7, wherein the processing circuitry outputs a detection result regarding a fraudulent communication, based on detection information obtained by the list-type detection and detection information obtained by the machine-learning-type detection.

12. The network security apparatus according to claim 8, wherein the processing circuitry outputs a detection result regarding fraudulent communication, based on detection information obtained by the list-type detection and detection information obtained by the machine-learning-type detection.

13. The network security apparatus according to claim 9, wherein the processing circuitry outputs a detection result regarding a fraudulent communication, based on detection information obtained by the list-type detection and detection information obtained by the machine-learning-type detection.

14. The network security apparatus according to claim 10, wherein the processing circuitry outputs a detection result regarding a fraudulent communication, based on detection information obtained by the list-type detection and detection information obtained by the machine-learning-type detection.

15. The network security apparatus according to claim 8, wherein the processing circuitry determines a list to be used in the list-type detection based on the load status of the list-type detection and the load status of the machine-learning-type detection, and specifies the list that has been determined for the list-type detection, and performs the list-type detection, using the list that has been specified.

16. The network security apparatus according to claim 15, wherein the processing circuitry assesses an overall load status of the network security apparatus, based on the load status of the list-type detection and the load status of the machine-learning-type detection, and determines the list in accordance with the overall load status of the network security apparatus.

17. The network security apparatus according to claim 15, wherein the processing circuitry outputs a detection result regarding a fraudulent communication, based on detection information obtained by the list-type detection and detection information obtained by the machine-learning-type detection.

18. The network security apparatus according to claim 16, wherein the processing circuitry outputs a detection result regarding a fraudulent communication, based on detection information obtained by the list-type detection and detection information obtained by the machine-learning-type detection.

19. A network security system comprising:
processing circuitry to:
receive a plurality of pieces of communication data from a network;
select one or more pieces of communication data from the plurality of pieces of communication data that have been received, using a selection filter;
accept the one or more pieces of communication data that have been selected, and perform list-type detection on the one or more pieces of communication data that have been accepted so as to detect a fraudulent communication;
accept each piece of communication data from which a fraudulent communication has not been detected by the list-type detection, and perform machine-learning-type detection on each piece of communication data that has been accepted so as to detect a fraudulent communication; and
determine a parameter value for specifying communication data to be selected, based on a load status of the list-type detection and a load status of the machine-learning-type detection, and set the parameter value that has been determined in the selection filter.

20. A network security method comprising:
receiving a plurality of pieces of communication data from a network;
selecting one or more pieces of communication data from the plurality of pieces of communication data that have been received, using a selection filter;
accepting the one or more pieces of communication data that have been selected, and performing list-type detection on the one or more pieces of communication data that have been accepted so as to detect a fraudulent communication;
accepting each piece of communication data from which a fraudulent communication has not been detected by the list-type detection, and performing machine-learning-type detection on each piece of communication data that has been accepted so as to detect a fraudulent communication; and
determining a parameter value for specifying communication data to be selected, based on a load status of the list-type detection and a load status of the machine-learning-type detection, and setting the parameter value that has been determined in the selection filter.

* * * * *